US011532987B2

(12) United States Patent
Han et al.

(10) Patent No.: US 11,532,987 B2
(45) Date of Patent: Dec. 20, 2022

(54) POWER CONVERSION CIRCUIT, POWER CONVERSION SYSTEM AND POWER CHIP

(71) Applicant: Halo Microelectronics Co., Ltd., Foshan (CN)

(72) Inventors: Shuang Han, Shenzhen (CN); Hai Tao, Sunnyvale, CA (US); Rui Liu, Fremont, CA (US); Jun Fan, Shanghai (CN); Liang Zhao, Shanghai (CN)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/226,941

(22) Filed: Apr. 9, 2021

(65) Prior Publication Data

US 2021/0359606 A1 Nov. 18, 2021

(30) Foreign Application Priority Data

May 15, 2020 (CN) .......................... 202010410475.3
Oct. 30, 2020 (CN) .......................... 202011188104.1

(51) Int. Cl.
*H02M 3/07* (2006.01)
*H02M 1/00* (2006.01)
*H02M 3/158* (2006.01)
*H02M 3/157* (2006.01)
*H02J 7/00* (2006.01)

(52) U.S. Cl.
CPC ....... *H02M 3/1586* (2021.05); *H02M 1/0095* (2021.05); *H02M 3/07* (2013.01); *H02M 3/157* (2013.01); *H02J 7/007* (2013.01); *H02J 2207/20* (2020.01)

(58) Field of Classification Search
CPC ......... H02M 3/07–073; H02M 1/0095; H02M 1/0058
See application file for complete search history.

(56) References Cited

U.S. PATENT DOCUMENTS

| 10,476,390 | B2 * | 11/2019 | Petersen | H02M 3/1582 |
|---|---|---|---|---|
| 10,547,241 | B1 * | 1/2020 | Li | H02M 3/1588 |
| 10,615,697 | B1 * | 4/2020 | Ferrari | H02M 3/18 |
| 10,720,843 | B1 * | 7/2020 | Wu | H02M 3/1584 |
| 11,011,991 | B1 * | 5/2021 | Mercer | H02M 1/15 |
| 11,290,027 | B1 * | 3/2022 | Han | H02J 7/02 |
| 2009/0033289 | A1 * | 2/2009 | Xing | H02J 7/007182 |
| | | | | 320/140 |

(Continued)

FOREIGN PATENT DOCUMENTS

| CN | 104052278 B | * 10/2018 | ............ H02M 1/08 |
|---|---|---|---|
| CN | 109565240 A | * 4/2019 | ............ H02M 1/08 |

(Continued)

*Primary Examiner* — Sisay G Tiku
(74) *Attorney, Agent, or Firm* — Slater Matsil, LLP

(57) ABSTRACT

An apparatus includes a first group of switches connected in series, a second group of switches connected in series, a first flying capacitor between a first common node and a third common node of the first group of switches, a second flying capacitor between a first common node and a third common node of the second group of switches, wherein the first group of switches and the second group of switches are configured such that the apparatus operates in one of three operating modes including a bypass operating mode, a hybrid operating mode and a boost/buck operating mode.

21 Claims, 11 Drawing Sheets

(56) References Cited

U.S. PATENT DOCUMENTS

| | | | | |
|---|---|---|---|---|
| 2009/0033293 | A1* | 2/2009 | Xing | H02J 7/02 |
| | | | | 323/284 |
| 2014/0266134 | A1* | 9/2014 | Zhak | H02M 7/4837 |
| | | | | 323/311 |
| 2014/0266135 | A1* | 9/2014 | Zhak | H02M 3/07 |
| | | | | 323/311 |
| 2017/0250607 | A1* | 8/2017 | Zhak | H02M 1/32 |
| 2018/0019665 | A1* | 1/2018 | Zhang | H02M 7/4837 |
| 2018/0041060 | A1* | 2/2018 | Walley | H02J 7/00 |
| 2019/0115765 | A1* | 4/2019 | Lai | H02J 7/008 |
| 2019/0348913 | A1* | 11/2019 | Zhang | H02M 1/08 |
| 2020/0119573 | A1* | 4/2020 | Dalena | H02M 3/158 |
| 2020/0161976 | A1* | 5/2020 | Song | H02M 3/158 |
| 2020/0212702 | A1* | 7/2020 | Fan | H02J 7/0072 |
| 2020/0266634 | A9* | 8/2020 | Lai | H02J 7/00712 |
| 2021/0067033 | A1* | 3/2021 | Jing | H02M 3/158 |

FOREIGN PATENT DOCUMENTS

| | | | | |
|---|---|---|---|---|
| CN | 111313707 | A * | 6/2020 | H02M 1/0095 |
| CN | 112928800 | A * | 6/2021 | |
| CN | 113595177 | A * | 11/2021 | |
| CN | 113595215 | A * | 11/2021 | |
| CN | 113746178 | A * | 12/2021 | |
| CN | 114050618 | A * | 2/2022 | |
| DE | 102019003177 | A1 * | 11/2019 | H02M 1/08 |
| EP | 3709490 | A1 * | 9/2020 | H02M 1/00 |
| WO | WO-20112207 | * | 6/2020 | |

\* cited by examiner

POWER CONVERSION CIRCUIT, POWER CONVERSION SYSTEM AND POWER CHIP

PRIORITY CLAIM

This application claims priority to Chinese Patent Application No. 202011188104.1, filed on Oct. 30, 2020 and Chinese Patent Application No. 202010410475.3, filed on May 15, 2020, each of which is hereby incorporated by reference in its entirety.

TECHNICAL FIELD

The present disclosure relates to the technical field of power conversion, and in particular, relates to a power conversion circuit, a power conversion system, and a power chip. The present disclosure also relates to the technical field of DC-DC power conversion, and in particular, relates to a battery charging system based on a charge pump-based DC/DC converter.

BACKGROUND

At present, batteries of electronic devices are generally charged by wired charging, which is a common charging mode, and wireless charging, which is a new charging mode prevailing in the recent years. With respect to rechargeable batteries, a single cell battery has a maximum voltage of 5 V, whereas a voltage of an input power source is generally several times of the maximum voltage of the single cell battery, for example, 20 V. In this case, for maximum reduction of power loss during the charging, a charging device needs to buck the 20 V high voltage to a 5 V low voltage, and then charges the batteries. If the charge pump technology is employed, generally, two DC/DC convention modules respectively having conversion ratios of 4:2 and 2:1 are cascaded to convert the 20 V high voltage into the 5 V low voltage. In addition, to accommodate the requirements of pre-charging and CV-mode charging, an additional charging module is generally needed.

With respect to a battery set including a plurality of single batteries connected in series, using two batteries connection in series as an example, a total voltage is generally less than 10 V. In a case where the input power source supplies a 20 V voltage, first the 20 V voltage needs to be converted to 10 V by using a DC/DC conversion module, and then the total voltage of the double cell batteries is converted to the voltage of a single cell battery by using a buck conversion module, to accommodate the requirements of the maximum system power source voltage. In a case where the input voltage is only 5 V, generally a buck-boost charging module needs to be additionally arranged. That is, in a case where comprehensive charging is supported, if this charging architecture is employed, at least two DC/DC conversion modules and one buck-boost charging module are needed.

Therefore, in the charging architecture in the related art, too many modules are used. This redundant architecture causes a high cost and occupies a large volume.

Modern smart phones generally require two power sources to charge their batteries, a wireless power source and a USB power sources. For efficient and cost-effective charging of the batteries, the voltage of an input power may be up to 20 V (for example, a USB PD-based adapter or wireless fast-charging). However, the maximum voltage of a single cell battery is lower than 5V. For minimization of power loss during charging of the battery, efficient DC/DC conversion is required so as to lower the voltage of the USB or the wireless power source to 5 V or lower. The charge pump-based DC/DC conversion technology can achieve this voltage conversion with up to 98% efficiency in case of either 2:1 bucking or 1:2 boosting, whereas for a single cell battery power system, two cascaded (first 4:2 then 2:1) charge pump-based converters are required to convert a high input voltage (20 V at maximum) to the voltage (5V at maximum) of a single cell battery. Since the charge pump-based DC/DC converter constantly operates in an open loop, additional switching power chargers are required to perform battery pre-charging and CV charging to complete an entire battery charging cycle. A typical single cell battery charging system as described above is shown in FIG. 7. This architecture requires two stages of conversion chips, as well as a switching charging chip responsible for pre-charging and CV charging, resulting in many external components and a large PCB area.

For two batteries connected in series, single-stage conversion (4:2) is required to achieve efficient charging because the battery voltage is doubled compared to a single cell battery. But an additional buck voltage converter (e.g., 2:1) is required to convert the voltage of two batteries to the voltage a single cell battery voltage to meet the requirement of a maximum system supply voltage of 4.5 V. FIG. 8 shows a typical two-battery charging system in a modern smart phone. In FIG. 8, two power sources are provided: a wireless power source and a USB power source. For efficiently charging the battery, the voltage of the power source may be up to 20 V. However, the maximum voltage of the double cell batteries is lower than 10 V. A high input voltage may be lowered in a plurality of ways. Charge pump-based DC/DC conversion is the main technology in such applications, which achieves efficiencies as high as 98%. This system also needs to support input from a USB in a 1:1 operating mode to directly charge the battery, so as to support the traditional direct charging adapter. This requires that the charge pump-based system must operate in a 1:1 bypass mode. In the case of using only a dedicated charging port (DCP) adapter, since the input voltage is only 5 V, a buck-boost type charging chip is also required in this system. This charging architecture requires two DC/DC converters and one buck-boost switching power charger, resulting in many external components and a large PCB area.

SUMMARY

Embodiments of the present disclosure provide a power conversion circuit, a power conversion system, and a power chip, which may solve the technical problem in the related art that the cost is high and the volume is large because a large number of modules are used in a power conversion process for supporting a plurality of operating modes.

To solve the above technical problem, the embodiments of the present disclosure provide the following technical solutions:

In a first aspect, the embodiments of the present disclosure provide a power conversion circuit. The power conversion circuit includes a first power conversion module, a second power conversion module, a first energy storage capacitor, and a second energy storage capacitor, a first filter inductor, a second filter inductor, a first filter capacitor, and a second filter capacitor. One terminal of the first power conversion module and one terminal of the second power conversion module are both connected to a first port, and the other terminal of the first power conversion module and the other terminal of the second power conversion module are both grounded. The first power conversion module includes a first power switch transistor, a second power switch transistor, a third power switch transistor, a fourth power switch transistor, and a fifth power switch transistor that are connected in series in sequence. The second power conversion module includes a sixth power switch transistor, a seventh power switch transistor, an eighth power switch transistor, a ninth power switch transistor, and a tenth power switch transistor that are connected in series in sequence. A first connection point between the second power switch transistor and the third power switch transistor, a second connection point between the seventh power switch transistor and the eighth power switch transistor, and one terminal of the first filter capacitor are all connected to a second port, and the other terminal of the first filter capacitor is grounded. One terminal of the first energy storage capacitor is connected to a third connection point between the first power switch transistor and the second power switch transistor, and the other terminal of the first energy storage capacitor is connected to a fourth connection point between the third power switch transistor and the fourth power switch transistor. One terminal of the second energy storage capacitor is connected to a fifth connection point between the sixth power switch transistor and the seventh power switch transistor, and the other terminal of the second energy storage capacitor is connected to a sixth connection point between the eighth power switch transistor and the ninth power switch transistor. One terminal of the first filter inductor is connected to a seventh connection point between the fourth power switch transistor and the fifth power switch transistor, one terminal of the second filter inductor is connected to an eighth connection point between the ninth power switch transistor and the tenth power switch transistor. The other terminal of the first filter inductor, the other terminal of the second filter inductor, and one terminal of the second filter capacitor are all connected to a third port; and the other terminal of the second filter capacitor is grounded.

Optionally, the first power switch transistor and the third power switch transistor are controlled by a first control signal, the sixth power switch transistor and the eighth power switch transistor are controlled by a second control signal, the second power switch transistor is controlled by a third control signal, the seventh power switch transistor is controlled by a fourth control signal, the fourth power switch transistor is controlled by a fifth control signal, the ninth power switch transistor is controlled by a sixth control signal, the fifth power switch transistor is controlled by a seventh control signal, and the tenth power switch transistor is controlled by an eighth control signal.

Optionally, the power conversion circuit further includes a third filter capacitor; wherein a first terminal of the first power conversion module, a first terminal of the second power conversion module, and one terminal of the third filter capacitor are all connected to the first port, and the other terminal of the third filter capacitor is grounded.

Optionally, the power conversion circuit further includes a first resonant inductor and a second resonant inductor; wherein the first resonant inductor and the first energy storage capacitor are connected in series between the third connection point and the fourth connection point, and the second resonant inductor and the second energy storage capacitor are connected in series between the fifth connection point and the sixth connection point.

Optionally, the power conversion circuit further includes a first load switch; wherein one terminal of the first load switch is configured to be connected to a first load terminal, and the other terminal of the first load switch is connected to the first port.

Optionally, the power conversion circuit further includes a second load switch; wherein one terminal of the second load switch is configured to be connected to a second load terminal, and the other terminal of the second load switch is connected to the first port.

Optionally, the power conversion circuit further includes a third load switch; wherein one terminal of the third load switch is configured to be connected to a third load terminal, and the other terminal of the third load switch is connected to the second port.

Optionally, the power conversion circuit further includes a controller; wherein the controller is connected to the first power switch transistor, the second power switch transistor, the third power switch transistor, the fourth power switch transistor, the fifth power switch transistor, the sixth power switch transistor, the seventh power switch transistor, the eighth power switch transistor, the ninth power switch transistor, and the tenth power switch transistor.

Optionally, the power conversion circuit operates in a first operating mode; wherein in the first operating mode, the first control signal, the second control signal, the third control signal, the fourth control signal, the fifth control signal, and the sixth control signal are first level signals, and the seventh control signal and the eighth control signal are second level signals.

Optionally, the power conversion circuit operates in a second operating mode; wherein n the second operating mode, the first control signal and the second control signal have a first duty cycle and have a 180-degree phase difference, the third control signal, the fourth control signal, the seventh control signal, and the eight control signal have a second duty cycle, the third control signal and the seventh control signal have a 180-degree phase difference with the fourth control signal and the eighth control signal, and the fifth control signal and the sixth control signal are first level signals. The first duty cycle is complementary to the second duty cycle, and the first control signal, the second control signal, the third control signal, the fourth control signal, the seventh control signal, and the eighth control signal operate on the same frequency.

Optionally, the power conversion circuit operates in a third operating mode; wherein in the third operating mode, the first control signal, the second control signal, the third control signal, and the fourth control signal are first level signals, the fifth control signal and the sixth control signal have a third duty cycle and have a 180-degree phase difference, and the seventh control signal and the eighth control signal have a fourth duty cycle and have a 180-degree phase difference. The third duty cycle is complementary to the fourth duty cycle, and the fifth control signal, the sixth control signal, the seventh control signal, and the eighth control signal operate on the same frequency.

In a second aspect, the embodiments of the present disclosure provide a power conversion system. The power conversion system includes a power source, and the power conversion circuit as described above. The power conversion circuit is connected to the power source.

In a third aspect, the embodiments of the present disclosure provide a power chip. The power chip includes the power conversion circuit as described above.

The embodiments of the present disclosure achieve the following beneficial effects: As compared with the related art, the embodiments of the present disclosure provide a power conversion circuit, a power conversion system, and a power chip. The power conversion circuit includes a first power conversion module and a second power conversion module. The first power conversion module and the second power conversion module each include five power switch transistors that are connected in series. A first port, a second port, and a third port that are used as input ports or output ports may be led out from the first power conversion module and the second power conversion module. By controlling the power switch transistors on the first power conversion module and the second power conversion module, a first port voltage, a second port voltage, and a third port voltage may be accurately acquired, such that power conversion may be implemented in a plurality of operating modes. Since there is no need to employ a plurality of combined or cascaded conversion modules to support the plurality of operating modes, the redundancy is lowered, and the cost are saved, and the area occupied on a PCB board is reduced.

The present disclosure is intended to overcome the defect in the related art, and provide a DC/DC power conversion system, which is capable of providing high-frequency and high-efficiency operating modes, achieving different conversion ratios in closed-loop operation, and accurately controlling an output voltage or current during open-loop operation and operating in a bypass mode.

In view of the above, the present disclosure provides a DC/DC power conversion system. The power conversion system includes a first power switch circuitry and a second power switch circuitry. The first power switch circuitry includes at least four power switches that are connected in series. A first power switch and a third power switch of the first power switch circuitry are controlled by a first duty cycle, and a second power switch and a fourth power switch of the first power switch circuitry are controlled by a second duty cycle. The second power switch circuitry includes at least four power switches that are connected in series. A first power switch and a third power switch of the second power switch circuitry are controlled by the first duty cycle, and a second power switch and a fourth power switch of the second power switch circuitry are controlled by the second duty cycle. The first duty cycle and the second duty cycle are complementary drive signals. The power conversion system further includes two sets of resonant units interacting with the first power switch circuitry and the second power switch circuitry respectively, a first output filter inductor and a second output filter inductor that are configured to average switching voltages from the first power switch circuitry and the second power circuitry respectively, and a fifth power switch interacting with one of the two sets of resonant units.

Further, the power conversion system further includes at least one first output filter capacitor. A first center point of the first power switch circuitry and a second center point of the second power switch circuitry are coupled and then coupled to the first output filter capacitor.

Further, the power conversion system further includes at least one second output filter capacitor. The second output filter capacitor is coupled in series to the first output filter inductor and the second output filter inductor.

Further, the power conversion system further includes a primary controller. The primary controller is coupled to the first power switch circuitry and the second power switch circuitry, and the primary controller provides the complementary drive signals of the first duty cycle and the second duty cycle for the first power switch circuitry and the second power switch circuitry.

Further, the first duty cycle and the second duty cycle operate at a fixed value 50% or in a varying fashion.

Further the primary controller provides a control signal for the fifth power switch.

Further, the power conversion system further includes an input source selecting module. The input source selecting module includes two power switches that are connected back-to-back.

Further, the power conversion system further includes an input controller configured to drive the two power switches of the input source selecting module.

With the above technical solution according to the present disclosure, the system is capable of implementing the following functions: (1) voltage bucking at a proportion of 4:1; (2) voltage bucking at a proportion of 2:1; (3) bypass at a proportion of 1:1; (4) reverse bypass at a proportion of 1:1; and (5) reverse voltage boosting at a proportion of 1:2, and reverse voltage boosting at a proportion of 1:4. In addition, the conversion system according to the present disclosure achieves higher conversion efficiency, needs fewer external units or components, and occupies a smaller area of the PCB board.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

For better understanding of the present disclosure, the present disclosure is described in detail with reference to attached drawings and specific embodiments. When an element is defined as "being connected or coupled to" another element, the element may be directly connected or coupled to the element or one or more centered elements may be present therebetween. In addition, the terms "first," "second," and the like are merely for the illustration purpose, and shall not be construed as indicating or implying a relative importance.

Unless the context clearly requires otherwise, throughout the specification and the claims, technical and scientific terms used herein denote the meaning as commonly understood by a person skilled in the art. Additionally, the terms used in the specification of the present disclosure are merely for description the embodiments of the present disclosure, but are not intended to limit the present disclosure. As used herein, the term "and/or" in reference to a list of one or more items covers all of the following interpretations of the term: any of the items in the list, all of the items in the list and any combination of the items in the list.

In addition, technical features involved in various embodiments of the present disclosure described hereinafter may be combined as long as these technical features are not in conflict.

Figure 1:
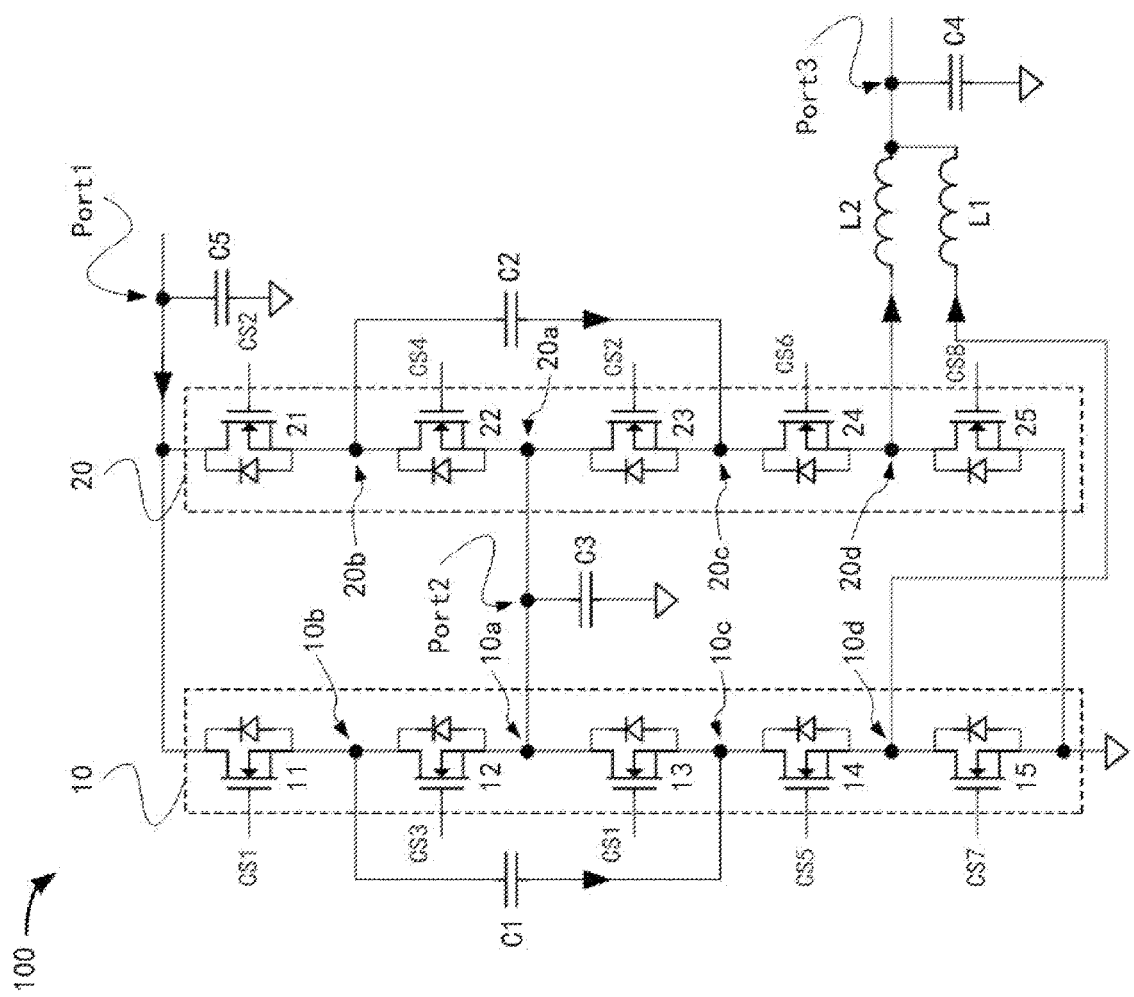
FIG. 1 illustrates a schematic structural diagram of a power conversion circuit according to an embodiment of the present disclosure.

Referring to FIG. 1, FIG. 1 is a power conversion circuit 100 according to an embodiment of the present disclosure. As illustrated in FIG. 1, the power conversion circuit 100 includes a first power conversion module 10, a second power conversion module 20, a first energy storage capacitor C1, a second energy storage capacitor C2, a first filter inductor L1, a second filter inductor L2, a first filter capacitor C3, and a second filter capacitor C4. One terminal of the first power conversion module 10 and one terminal of the second power conversion module 20 are both connected to a first port Port 1, and the other terminal of the first power conversion module 10 and the other terminal of the second power conversion module 20 are both grounded.

The first power conversion module 10 includes a first power switch transistor 11, a second power switch transistor 12, a third power switch transistor 13, a fourth power switch transistor 14, and a fifth power switch transistor 15. The second power conversion module 20 includes a sixth power switch transistor 21, a seventh power switch transistor 22, an eighth power switch transistor 23, a ninth power switch transistor 24, and a tenth power switch transistor 25 that are connected in series in sequence. A first connection point 10a between the second power switch transistor 12 and the third power switch transistor 13, a second connection point 20a between the seventh power switch transistor 22 and the eighth power switch transistor 23, and one terminal of the first filter capacitor C3 are all connected to a second port Port 2, and the other terminal of the first filter capacitor C3 is grounded.

One terminal of the first energy storage capacitor C1 is connected to a third connection point 10b between the first power switch transistor 11 and the second power switch transistor 12, and the other terminal of the first energy storage capacitor C1 is connected to a fourth connection point 10c between the third power switch transistor 13 and the fourth power switch transistor 14.

One terminal of the second energy storage capacitor C2 is connected to a fifth connection point 20b between the sixth power switch transistor 21 and the seventh power switch transistor 22, and the other terminal of the second energy storage capacitor C2 is connected to a sixth connection point 20c between the eighth power switch transistor 23 and the ninth power switch transistor 24.

One terminal of the first filter inductor L1 is connected to a seventh connection point 10d between the fourth switch power transistor 14 and the fifth power switch transistor 15. One terminal of the second filter inductor L2 is connected to an eighth connection point 20d between the ninth power switch transistor 24 and the tenth power switch transistor 25. The other terminal of the first filter inductor L1, the other terminal of the second filter inductor L2, and one terminal of the second filter capacitor 24 are all connected to a third port Port 3. The other terminal of the second filter capacitor 24 is grounded.

In this embodiment, by introducing the first port Port 1, the second port Port 2, and the third port Port 3 into the first power conversion module 10 and the second power conversion module 20, and controlling the five switch transistors of the first power conversion module 10 and the five power switch transistors of the second power conversion module 20, if any one of the ports is used as an input port and the other two ports are used as output ports, a plurality of different operating modes can be implemented. In the same operating mode, a voltage at the first port Port 1, a voltage at the second port Port 2, and a voltage at the third port Port 3 are all in accordance with a specific proportional relationship. For example, in an operating mode, in a case where any of the three ports is used as the input port and the other two ports are used as the output ports, the voltage at the first port Port 1, the voltage at the second port Port 2, and the voltage at the third port Port 3 are in a proportional relationship of 4:2:1. However, in another operating mode, the voltages of these three ports are in accordance with another proportional relationship. Therefore, the power conversion circuit 100 according to this embodiment is capable of operating in various different operating modes, implementing different voltage conversion ratios, effectively reducing the redundancy, and meanwhile saving the cost and reducing the area occupied on a PCB board.

It should be noted that the power conversion circuit 100 operates in different operating modes, and without departing from the inventive concept and spirit of the present disclosure, some devices may be omitted. For example, in a particular operating mode, one or more of the first energy storage capacitor C1, the second energy storage capacitor C2, the first filter capacitor C3, the second filter capacitor C4, the first resonant inductor L1, and the second resonant inductor L2 may be omitted. Therefore, the power conversion circuit 100 may have different variations. If these variations are capable of realizing the function of the embodiments of the present disclosure, these variations shall all be considered as falling within the protection scope of the embodiments of the present disclosure.

The power switch transistors of the first power conversion module 10 and the second power conversion module 20 may be any suitable switches or switch transistors, for example, NMOS transistors, PMOS transistors, or the like. In some embodiments, the first power switch transistor 11, the second power switch transistor 12, the third power switch transistors 13, the fourth power switch transistor 14, the fifth power switch transistor 15, the sixth power switch transistor 21, the seventh power switch transistor 22, the eighth power switch transistor 23, the ninth power switch transistor 24, and the tenth power switch transistor 25 are all NMOS transistors. As illustrated in FIG. 1, a drain of the first power switch transistor 11 is connected to the first port Port 1, a source of the first power switch transistor 11 and a drain of the second power switch transistor 12 are both connected to the third connection point 10*b*, a source of the second power switch transistor 12 and a drain of the third power switch transistor 13 are both connected to the first connection point 10*a*, a source of the third power switch transistor 13 and a source of the fourth power switch transistor 14 are both connected to the fourth connection point 10*c*, a drain of the fourth power switch transistor 14 and a drain of the fifth power switch transistor 15 are both connected to the seventh connection point 10*d*, and a source of the fifth power switch transistor 15 is grounded; a drain of the sixth power switch transistor 21 is connected to the first port Port 1, a source of the sixth power switch transistor 21 and a drain of the seventh power switch transistor 22 are both connected to the fifth connection point 20*b*, a source of the seventh power switch transistor 22 and a drain of the eighth power switch transistor 23 are both connected to the second connection point 20*a*, a source of the eighth power switch transistor 23 and a drain of the ninth power switch transistor 24 are both connected to the sixth connection point 20*c*, a source of the ninth power switch transistor 24 and a drain of the tenth power switch transistor 25 are both connected to the eighth connection point 20*d*, and the source of the tenth power switch transistor 25 is grounded.

A control signal is applied to a gate of the first power switch transistor 11, a gate of the second power switch transistor 12, a gate of the third power switch transistors 13, a gate of the fourth power switch transistor 14, a gate of the fifth power switch transistor 15, a gate of the sixth power switch transistor 21, a gate of the seventh power switch transistor 22, a gate of the eighth power switch transistor 23, a gate of the ninth power switch transistor 24, and the tenth power switch transistor 25. In some embodiments, the first power switch transistor 11 and the third power switch transistor 13 are controlled by a first control signal CS1, the sixth power switch transistor 21 and the eighth power switch transistor 23 are controlled by a second control signal CS2, the second power switch transistor 12 is controlled by a third control signal CS3, the seventh power switch transistor 22 is controlled by a fourth control signal CS4, the fourth power switch transistor 14 is controlled by a fifth control signal CS5, the ninth power switch transistor 24 is controlled by a sixth control signal CS6, the fifth power switch transistor 15 is controlled by a seventh control signal CS7, and the tenth power switch transistor 25 is controlled by an eighth control signal CS8. Each of the control signals is configured to control ON and OFF states, that is, turn-on and turn-off states, of the corresponding power switch transistor.

In some embodiments, the power conversion circuit 100 includes a controller. The controller is connected to the gate of the first power switch transistor 11, the gate of the second power switch transistor 12, the gate of the third power switch transistors 13, the gate of the fourth power switch transistor 14, the gate of the fifth power switch transistor 15, the gate of the sixth power switch transistor 21, the gate of the seventh power switch transistor 22, the gate of the eighth power switch transistor 23, a gate of the ninth power switch transistor 24, and the gate of the tenth power switch transistor 25 respectively, and configured to provide a corresponding control signal for each of the power switch transistors. The controller may be a general processor, a digital signal processor (DSP), an application specific integrated circuit (ASIC), a field programmable gate array (FPGA), a microcontroller unit, an Acorn RISC machine (ARM), or another programmable logic device, a discrete gate or transistor logic device, or a discrete hardware component or a combination of these components. Further, the controller may also be any traditional processor, controller, microcontroller or state machine. The controller may also be implemented as a combination of computing devices, for example, a combination of a DSP and a microprocessor, a plurality of microprocessors, one or more microprocessors plus a DSP core, and/or any other such configuration.

In some embodiments, as illustrated in FIG. 1, the power conversion circuit 100 further includes a third filter capacitor C5. One terminal of the first power conversion module 10, one terminal of the second power conversion module 20, and one terminal of the third filter capacitor C5 are all connected to the first port Port 1. The other terminal of the third filter capacitor C5 is grounded.

In some embodiments, the power conversion circuit 100 operates in a first operating mode. In the first operating mode, the first control signal CS1, the second control signal CS2, the third control signal CS3, the fourth control signal CS4, the fifth control signal CS5, and the sixth control signal CS6 are first level signals, and the seventh control signal CS7 and the eighth control signal CS8 are second level signals. The first level signal is a high level signal, and the second level signal is a low level signal. With reference to FIG. 1, the first power switch transistor 11, the second power switch transistor 12, the third power switch transistor 13, the fourth power switch transistor 14, the sixth power switch transistor 21, the seventh power switch transistor 22, and the eighth power switch transistor 23, the ninth power switch transistor 24 are all controlled in a turn-on state, and the fifth power switch transistor 15 and the tenth power switch transistor 25 are controlled in a turn-off state.

In this embodiment, any one of the first port Port 1, the second port Port 2, and the third port Port 3 is used as an input port, and the other two ports are used as output ports. For example, the first port Port 1 is used as the input port, and the second port Port 2 and the third port Port 3 are used as the output ports. In this case, the voltage at the first port Port 1, the voltage at the second port Port 2, and the voltage at the third port Port 3 are equal. Since in the first operating mode, an input voltage is equal to an output voltage, the first operating mode is also referred to as a "bypass mode." It should be noted that in this embodiment, the first energy storage capacitor C1 and the second energy storage capacitor C2 may be omitted.

In some embodiments, the power conversion circuit 100 operates in a second operating mode. In the second operating mode, the first control signal CS1 and the second control signal CS2 have a first duty cycle D1 and have a 180-degree phase difference, the third control signal CS3, the fourth control signal CS4, the seventh control signal CS7, and the eighth control signal CS8 have a second duty cycle, and the third control signal CS3 and the seventh control signal CS7 have a 180-degree phase difference with the fourth control signal CS4 and the eighth control signal CS8. The fifth control signal CS5 and the sixth control signal CS6 are first level signals. The first duty cycle D1 is complementary to the second duty cycle D2, and the first control signal CS1, the second control signal CS2, the third control signal CS3, the fourth control signal CS4, the seventh control signal CS7, and the eighth control signal CS8 operate on the same frequency.

Figure 2:
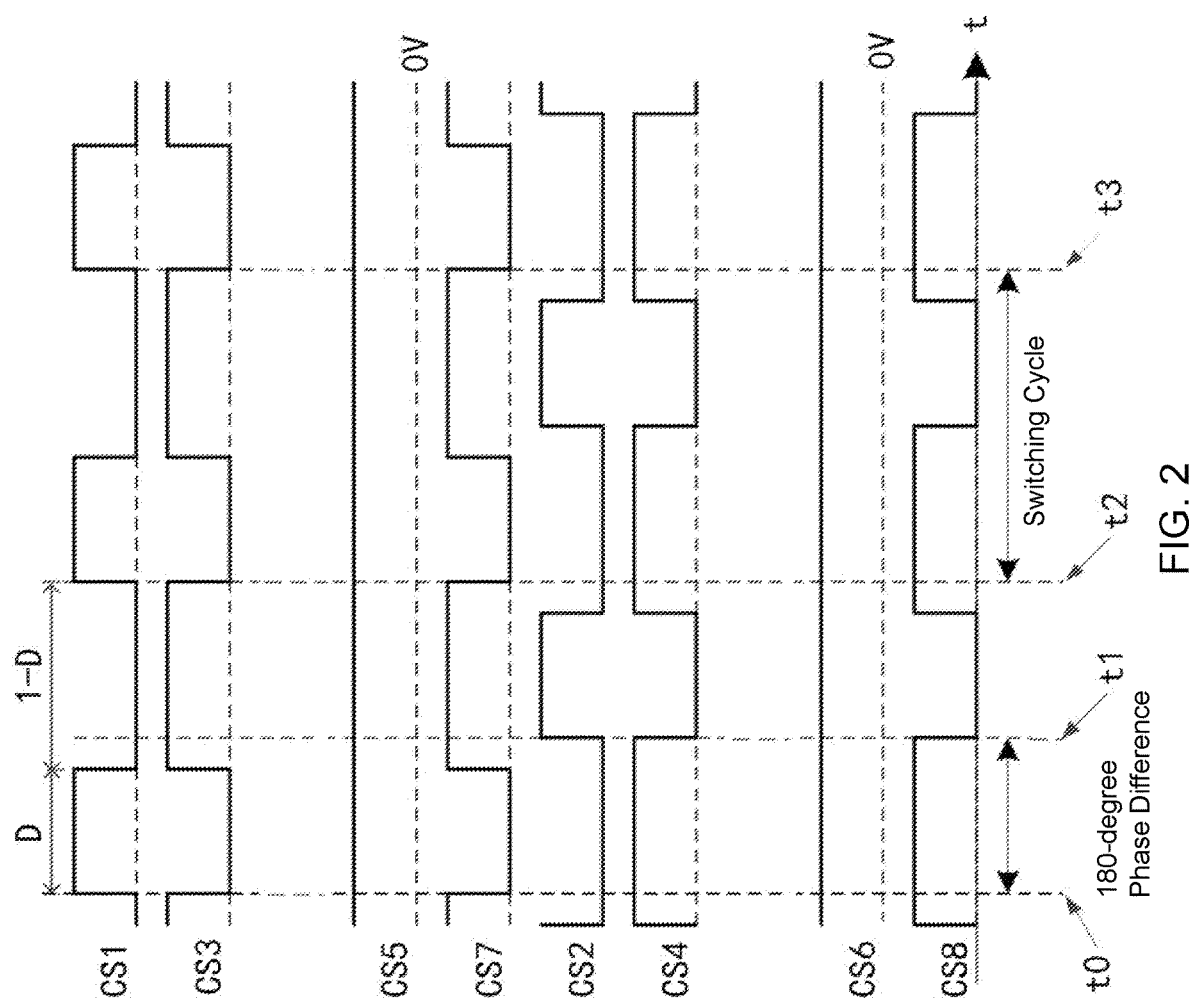
FIG. 2 illustrates a drive waveform of the power conversion circuit in FIG. 1 in a second operating mode.

This embodiment is described hereinafter with reference to FIG. 2. As illustrated in FIG. 2, the first level signal is a high level signal. With reference to FIG. 1, the fourth power switch transistor 14 and the ninth power switch transistor 24 are both controlled in a turn-on state. The first control signal CS1 and the second control signal CS2 have the same duty cycle D1, and have a 180-degree phase difference (a time difference between t0 and t1). The third control signal CS3, the fourth control signal CS4, the seventh control signal CS7, and the eighth control signal CS8 have the same duty cycle D2. The third control signal CS3 is synchronized with the seventh control signal CS7, and the fourth control signal CS4 is synchronized with the eighth control signal CS8. The third control signal CS3 and the fourth control signal CS4 have a 180-degree phase difference. The first duty cycle D1 may be any duty cycle. The first duty cycle D1 is complementary to the second duty cycle D2. For example, when the first duty cycle D1 is 40%, the second duty cycle D2 is 60% (60%=1−40%). The first control signal CS1, the second control signal CS2, the third control signal CS3, the fourth control signal CS4, the seventh control signal CS7, and the eighth control signal CS8 all operate with the same switching cycle (a time difference between t2 and t3), that is, in the same frequency.

In this embodiment, any one of the first port Port 1, the second port Port 2, and the third port Port 3 may be used as the input ports, and the other two ports are used as the output ports. In this case, the voltage at the first port Port 1, the voltage at the second port Port 2, and the voltage at the third port Port 3 are in a proportion of 2:1:D1. For example, it is assumed that the first port Port 1 is used as the input port, the second port Port 2 and the third port Port 3 are used as the output ports, the voltage at the first port Port 1 is 20 V, and the first duty cycle is 40%, then the voltage at the second port Port 2 is 10 V, and the voltage at the third port Port 4 is 4 V. This operating mode is also referred to as a "hybrid DC/DC mode."

In some embodiments, the power conversion circuit 100 operates in a third operating mode. In the third operating mode, the first control signal CS1, the second control signal CS2, the third control signal CS3, and the fourth control signal CS4 are all first level signals, the fifth control signal CS5 and the sixth control signal CS6 have a third duty cycle D3 and have a 180-degree phase difference, and the seventh control signal CS7 and the eighth control signal CS8 have a fourth duty cycle D4 and have a 180-degree phase difference. The third duty cycle D3 is complementary to the fourth duty cycle D4. The fifth control signal CS5, the sixth control signal CS6, the seventh control signal CS7, and the eighth control signal CS8 operate on the same frequency.

Figure 3:
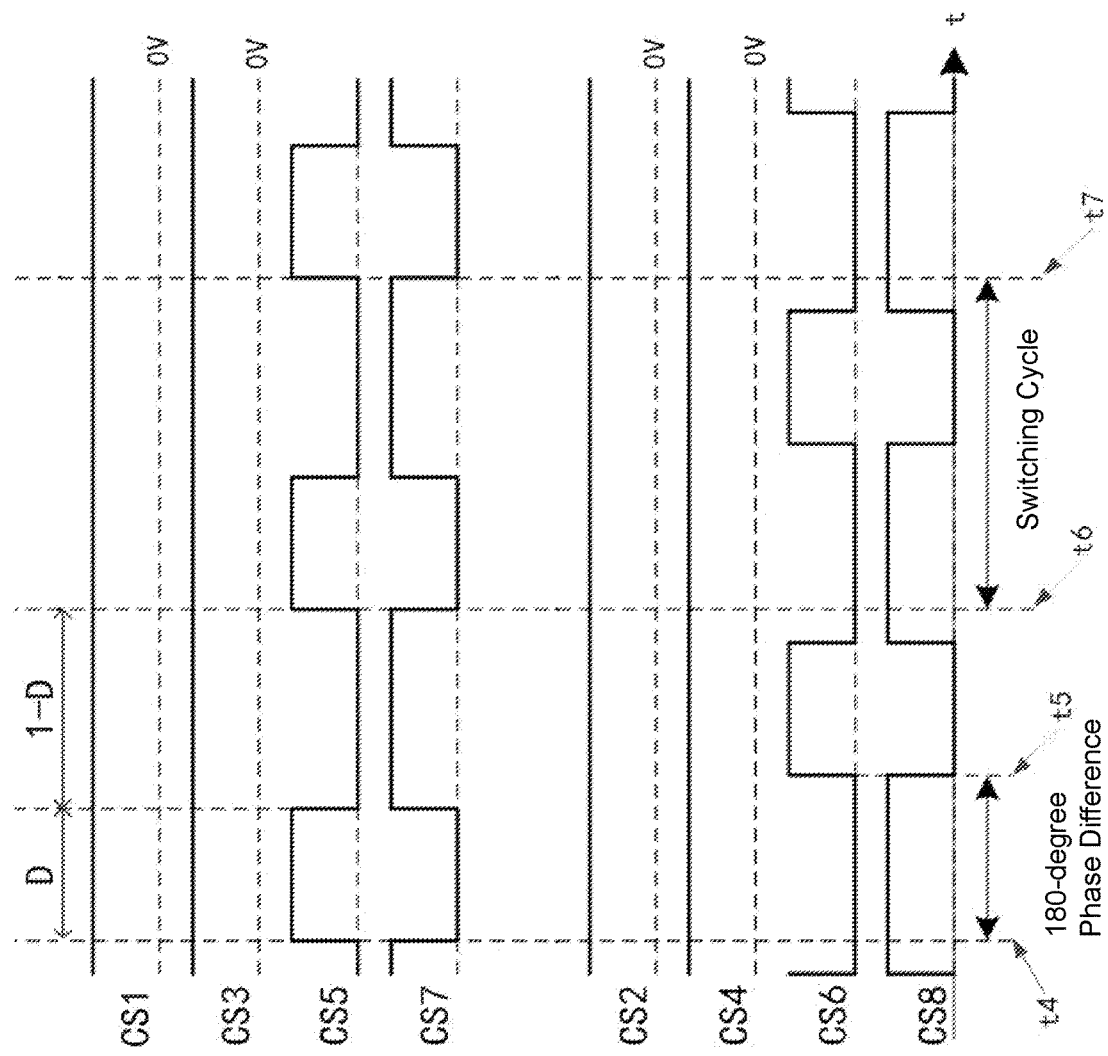
FIG. 3 illustrates a drive waveform of the power conversion circuit in FIG. 1 in a third operating mode.

This embodiment is described hereinafter with reference to FIG. 3. As illustrated in FIG. 3, the first level signal is a high level signal. With reference to FIG. 1, the first power switch transistor 11, the second power switch transistor 12, the third power switch transistor 13, the sixth power switch transistor 21, the seventh power switch transistor 22, and the eighth power switch transistor 23 are all controlled in a turn-on state. The fifth control signal CS5 and the sixth control signal CS6 have the same duty cycle D3, and have a 180-degree phase difference (a time difference between t4 and t5). The seventh control signal CS7 and the eighth control signal CS8 have the same duty cycle D4, and have a 180-degree phase difference. The third duty cycle D3 may be any duty cycle, and the third duty cycle D3 is complementary to the fourth duty cycle D4. For example, when the third duty cycle D3 is 40%, the fourth duty cycle D4 is 60% (60% 1−40%). The fifth control signal CS5, the sixth control signal CS6, the seventh control signal CS7, and the eighth control signal CS8 all operate with the same switching cycle (a time difference between t6 and t7), that is, on the same frequency.

In this embodiment, any one of the first port Port 1, the second port Port 1, and the third port Port 3 may be used as the input ports, and the other two ports are used as the output ports. In this case, the voltage at the first port Port 1, the voltage at the second port Port 2, and the voltage at the third port Port 3 are in a proportion of 1:1:D3. For example, it is assumed that the first port Port 1 is used as the input port, the second port Port 2 and the third port Port 3 are used as the output ports, the voltage at the first port Port 1 is 20 V, and the third duty cycle is 40%, then the voltage at the second port Port 2 is 20 V, and the voltage at the third port Port 3 is 8 V. In this case, the voltage at the output port is bucked relative to the voltage at the input port. For example, it is assumed that the third port Port 3 is used as the input port, the first port Port 1 and the second port Port 2 are used as the output ports, the voltage at the third port Port 3 is 5 V, and the third duty cycle is 40%, then the voltage at the second port Port 2 and the voltage at the third port Port 3 are both 12.5 V. In this case, the voltage at the output port is boosted relative to the voltage at the input port. Therefore, this operating mode is also referred to as a "dual-phase boost/buck mode." Further referring to FIG. 1, the fourth power switch transistor 14 and the first filter inductor L1 constitute a first boost/buck converter, and the ninth power switch transistor 24 and the second filter inductor L2 constitute a second boost/buck converter, such that dual-phase voltage boosting/bucking is implemented. In this embodiment, the first energy storage capacitor C1 and the second energy storage capacitor C2 may be omitted.

It should be noted that the first operating mode, the second operating mode, and the third operating mode are all operated based on the embodiment as illustrated in FIG. 1. By two-phase control (the first power conversion module 10 is used as a first phase, and the second power conversion module 20 is used as a second phase), different voltage conversion ratios are obtained under different open-loop operations, such that various voltage conversion requirements are satisfied. In fact, in some application scenarios, by single-phase control, the three operating modes may also be implemented. For example, the second power conversion module 20 may be omitted, and the first power conversion module 10 is singly controlled. For details of the method for controlling the first power conversion module 10, reference may be made to the above embodiments, which are not described herein any further. It may be understood that due to single-phase control, during operations of the three operating modes, only single-phase voltage boosting/bucking is achieved, whereas dual-phase voltage boosting/bucking cannot be achieved.

Figure 4:
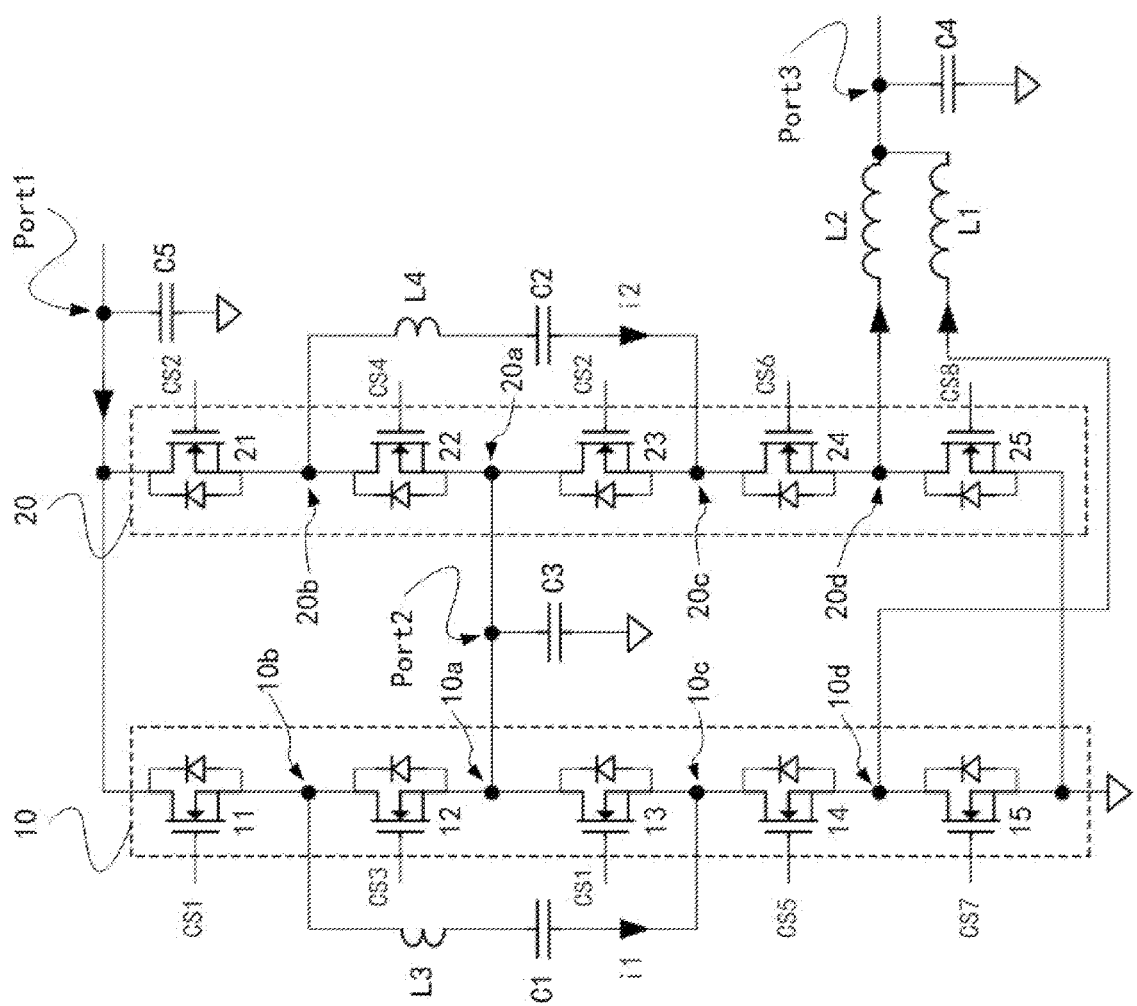
FIG. 4 illustrates a schematic structural diagram of a power conversion circuit according to another embodiment of the present disclosure.

In some embodiments, the power conversion circuit 100 further includes a first resonant inductor L3 and the second resonant inductor L4. The first resonant inductor L3 and the first energy storage capacitor C1 are connected in series between the third connection point 10b and the fourth connection point 10c, and the second resonant inductor L4 and the second energy storage capacitor C2 are connected in series between the fifth connection point 20b and the sixth connection point 20c. As illustrated in FIG. 4, in some embodiments, one terminal of the first resonant inductor L3 is connected to the third connection point 10b, the other terminal of the first resonant inductor L3 is connected to one terminal of the first energy storage capacitor C1, and the other terminal of the first energy storage capacitor C1 is connected to the fourth connection point 10c; and one terminal of the second resonant inductor L4 is connected to the fifth connection point 20b, the other terminal of the second resonant inductor L4 is connected to one terminal of the second energy storage capacitor C2, and the other terminal of the second energy storage capacitor C2 is connected to the sixth connection point 20c.

In this embodiment, as illustrated in FIG. 4, parameters and dimensions of the first filter inductor L1 and the second filter inductor L2 may affect the operating frequency of the power conversion circuit 100. Generally, by reducing the dimensions of the first filter inductor L1 and the second filter inductor L2, the operating frequency of the power conversion circuit 100 may be increased accordingly. However, increasing the operating frequency may cause an increase of switching loss, and thus causing a reduction of the conversion efficiency. Therefore, in this embodiment, the problem of the low conversion efficiency caused by reduction of the dimensions of the first filter inductor L1 and the second filter inductor L2 is overcome by introducing the first resonant inductor L3 and the second resonant inductor L4. The first resonant inductor L3 and the first energy storage capacitor C1 form a resonant circuit, and the second resonant inductor L4 and the second energy storage capacitor C2 form another resonant circuit, such that during the practical operation of the power conversion circuit 100, the operating frequency is increased while a high conversion efficiency can still be achieved.

Figure 5:
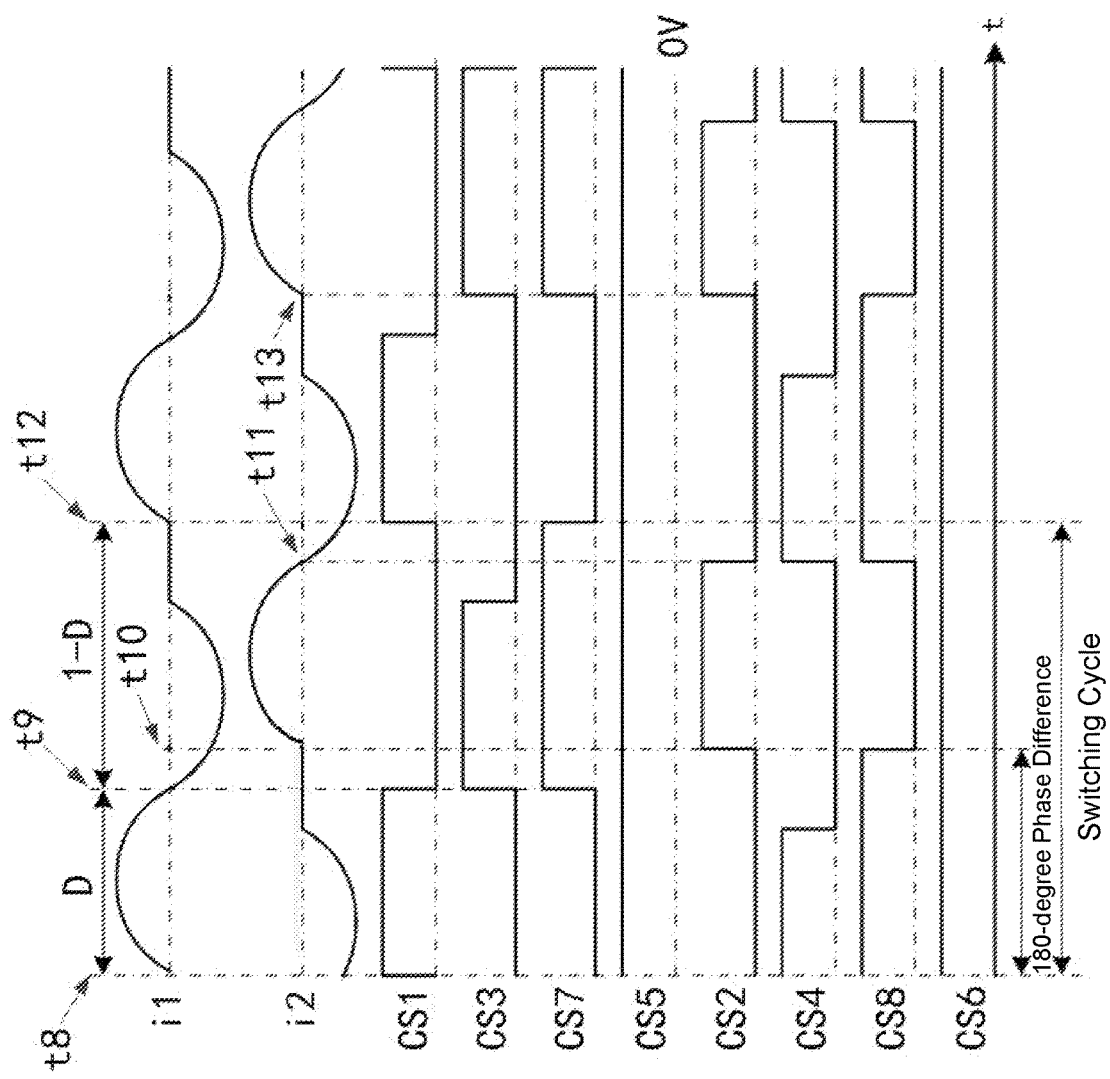
FIG. 5 illustrates a drive signal and a current waveform of the power conversion circuit in FIG. 4 in the second operating mode.

This embodiment is described hereinafter with reference to FIG. 5. As illustrated in FIG. 5, under initial conditions, all the power switch transistors are in a turn-off state. In this case, currents flowing through the first resonant inductor L3 and the second resonant inductor L4 are both 0, and a voltage applied between two terminals of the first energy storage capacitor C1 and a voltage applied between two terminals of the second energy storage capacitor C2 are both 0. During a time duration between t8 and t9, the first power switch transistor 11 and the third power switch transistor 13 are controlled in a turn-on state, such that a current i1 progressively rises up along a half-wave from 0, and progressively falls down to 0 upon reaching a half-wave peak. During this time duration, the current i1 charges the first energy storage capacitor C1 and the first filter capacitor C3. When the current i1 falls down to 0 (time t9), the first power switch transistor 11 and the third power switch transistor 13 are controlled in a turn-off state. In this case, the second power switch transistor 12, the fourth power switch transistor 14, and the fifth power switch transistor 15 are controlled in the turn-on state, such that the current i1 progressively falls along the half-wave from 0, and progressively rises up to 0 upon reaching a half-wave valley. During this time duration, the current i1 discharges the first energy storage capacitor C1 and meanwhile charges the first filter capacitor C3. When the current i1 rises up to 0, the second power switch transistor 12 and the fifth power switch transistor 15 are controlled in the turn-off state, and the power switch transistors enter a next cycle at time t12. One cycle is equivalent to a switching cycle.

Correspondingly, during a time duration between t10 and t11, the sixth power switch transistor 21 and the seventh power switch transistor 23 are controlled in a turn-on state, such that a current i2 progressively rises up along a half-wave from 0, and progressively falls down to 0 upon reaching a half-wave peak. During this time duration, the current i2 charges the second energy storage capacitor C2 and the first filter capacitor C3. When the current i2 falls down to 0 (time t11), the sixth power switch transistor 21 and the seventh power switch transistor 23 are controlled in a turn-off state. In this case, the seventh power switch transistor 22, the ninth power switch transistor 24, and the tenth power switch transistor 25 are controlled in the turn-on state, such that the current i2 progressively falls down along the half-wave from 0, and progressively rises up to 0 upon reaching a half-wave valley. During this time duration, the current i2 discharges the second energy storage capacitor C2 and meanwhile charges the first filter capacitor C3. When the current i2 rises up to 0, the seventh power switch transistor 22 and the tenth power switch transistor 25 are controlled in the turn-off state, and the power switch transistors enter a next cycle at time t13. One cycle is equivalent to a switching cycle.

Therefore, by introducing the first resonant inductor L3 and the second resonant inductor L4, a resonant circuit is formed by the first resonant inductor L3 and the first energy storage capacitor C1, and a resonant circuit is formed by the second resonant inductor L4 and the second energy storage capacitor C2. In one aspect, this reduces the dimensions of the first filter inductor L1 and the second filter inductor L2 and increases the operating frequency; and in another aspect, by controlling all the power switch transistors to be switched between ON and OFF when the current is 0, zero voltage switching (ZVS) is achieved, and the switching loss is effectively reduced, such that a high conversion efficiency is achieved in high-frequency operations.

In addition, similar to the embodiment as illustrated in FIG. 1, the first operating mode, the second operating mode, and the third operating mode may be also operated. The method operated in the second operating mode is similar to the control method as illustrated in FIG. 2, which is not described herein any further. The method operated in the third operating mode is similar to the control method as illustrated in FIG. 3, which is not described herein any further. Likewise, any one of the first port Port 1, the second port Port 2, and the third port Port 3 can be used as an input port, while the other ports are used as output ports, and by the control methods as illustrated in FIG. 2 and FIG. 3, the above corresponding voltage conversion ratio is obtained. It should be noted that in the second operating mode, least time when the control signals enable the power switch transistors in one switching cycle shall not be less than a half of a resonance cycle. Enabling the power switch transistors refers to causing the power switch transistors to be in a turn-on state, and the resonance cycle is determined based on the parameters of the first resonant inductor L3 and the first energy storage capacitor C1/the second resonant inductor L4 and the second energy storage capacitor C2.

Figure 6:
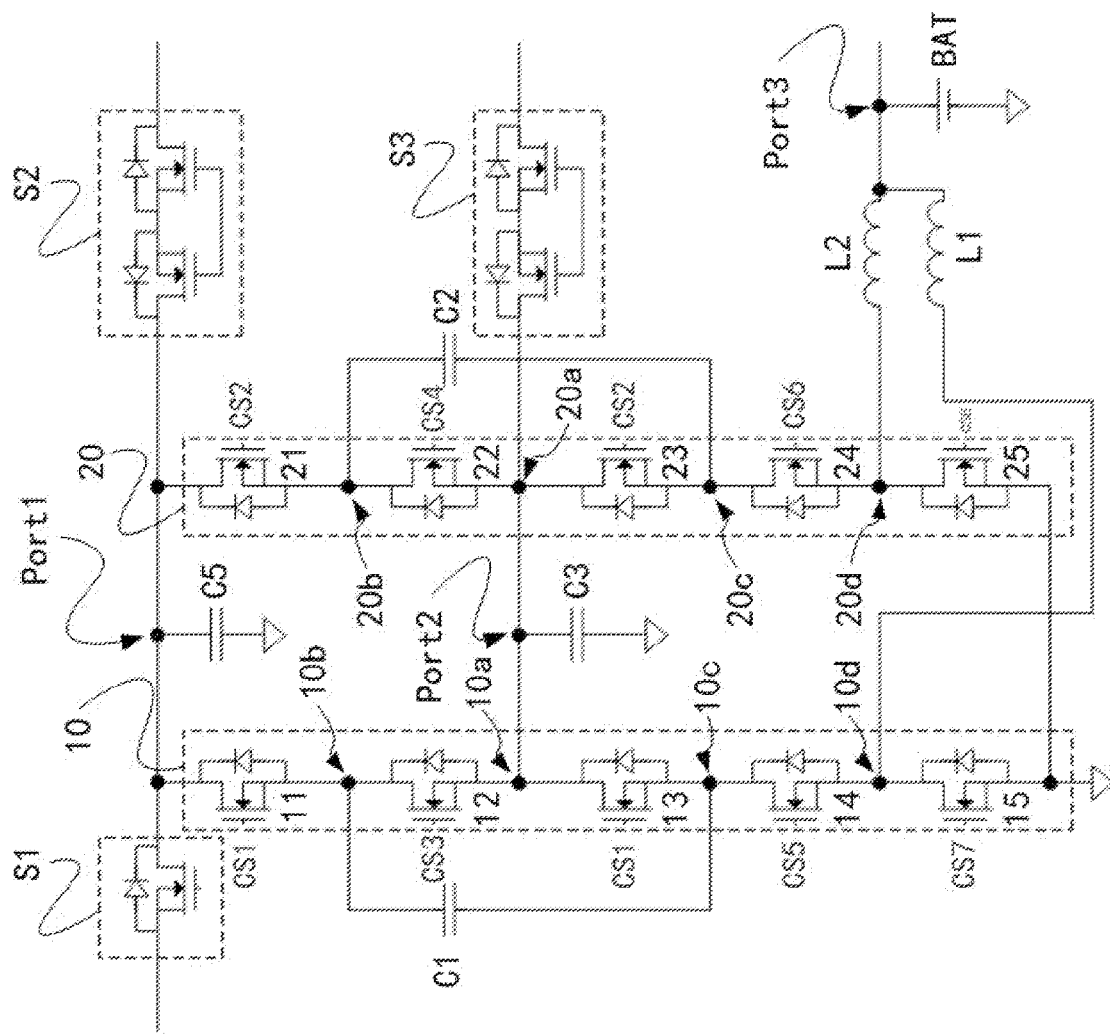
FIG. 6 illustrates a schematic structural diagram of a power conversion circuit according to another embodiment of the present disclosure.
Figure 7:
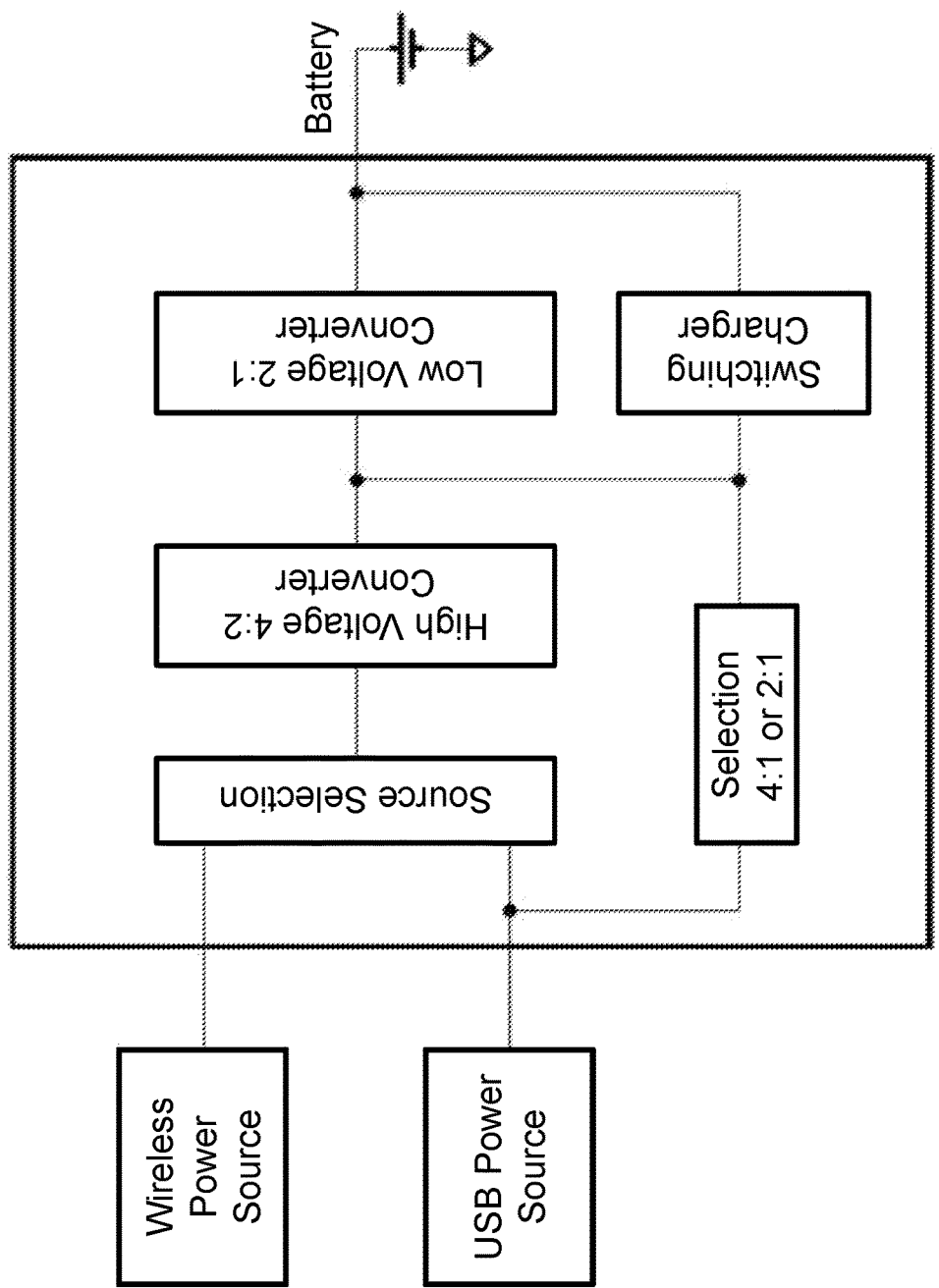
FIG. 7 is a schematic block diagram of a conventional charging system for use in a single cell battery-based system.
Figure 8:
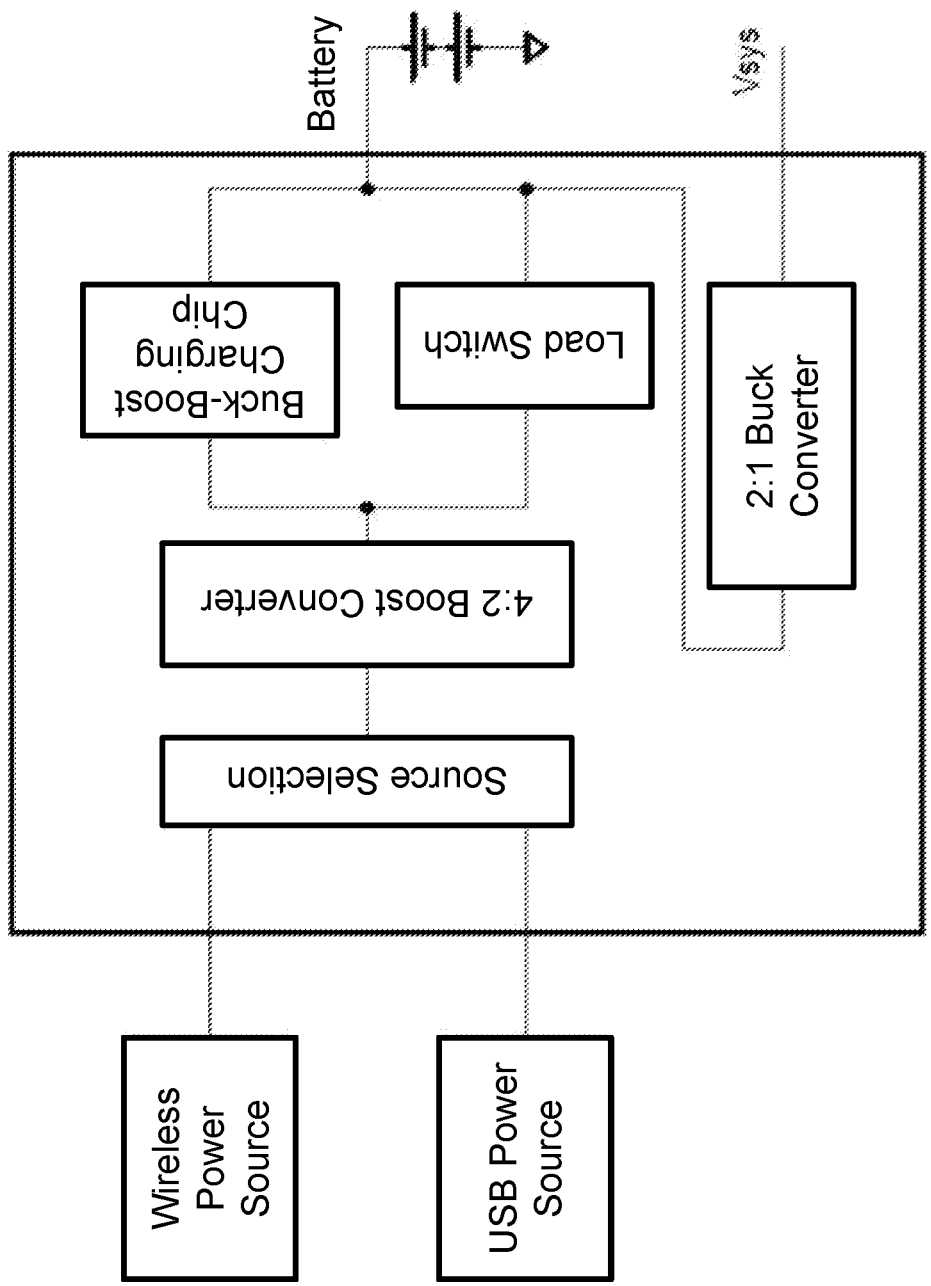
FIG. 8 is a schematic block diagram of a conventional charging system for use in a double cell battery-based system.

In some embodiments, as illustrated in FIG. 6, the power conversion circuit 100 further includes a first load switch S1. One terminal of the first load switch S1 is connected to a first load terminal, and the other terminal of the first load switch S1 is connected to the first port Port 1. The first load terminal may be connected to any suitable load, wherein the load may include any power source, power-consuming load, and any other load.

In this embodiment, the first load switch S1 achieves an input selection function. For example, a battery BAT is connected to the third port Port 3, and if the first port Port 1 is used as the input port, the first load switch S1 is controlled to be turned on. In this case, the input voltage may be applied to the first port Port 1 via the first load terminal. If the first port Port 1 is not used as the input port, the first load switch S1 is controlled to be turned off. In some embodiments, the first load switch S1 includes an NMOS transistor, wherein a source of the NMOS transistor is connected to a load, and a drain of the NMOS transistor is connected to the first port Port 1.

In some embodiments, as illustrated in FIG. 6, the power conversion circuit 100 further includes a second load switch S2. One terminal of the second load switch S2 is connected to a second load terminal, and the other terminal of the second load switch S2 is connected to the first port Port 1. The second load terminal may be connected to any suitable load, wherein the load may include any power source, power-consuming load, and any other load.

In this embodiment, the second load switch S2 achieves an input selection function. For example, a battery BAT is connected to the third port Port 3, and if the first port Port 1 is used as the input port, the second load switch S2 is controlled to be turned on. In this case, the input voltage may be applied to the first port Port 1 via the second load terminal. If the first port Port 1 is not used as the input port, the second load switch S2 is controlled to be turned off. In some embodiments, the second load switch S2 includes two NMOS transistors connected back-to-back, wherein a source and a drain of one NMOS transistor are respectively connected to a source of the other NMOS transistor and the first port Port 1, and a drain of the other NMOS transistor is connected to a load.

In some embodiments, as illustrated in FIG. 6, the power conversion circuit 100 further includes a third load switch S3. One terminal of the third load switch S3 is connected to a third load terminal, and the other terminal of the third load switch S3 is connected to the second port Port 2. The third load terminal may be connected to any suitable load, wherein the load may include any power source, power-consuming load, and any other load.

In this embodiment, the third load switch S3 achieves an input selection function. For example, a battery BAT is connected to the third port Port 3, and if the second port Port 2 is used as the input port, the third load switch S3 is controlled to be turned on. In this case, the input voltage may be applied to the first port Port 1 via the third load terminal. If the first port Port 1 is not used as the input port, the second load switch S2 is controlled to be turned off. In some embodiments, the third load switch S3 includes two NMOS transistors connected back-to-back, wherein a source and a drain of one NMOS transistor are respectively connected to a source of the other NMOS transistor and the second port Port 2, and a drain of the other NMOS transistor is connected to a load.

For flexibly selecting a suitable input voltage and applying the input voltage to the first port Port 1 or the second port Port 2 for voltage conversion, in some embodiments, the power conversion circuit 100 further includes the first load switch S1, the second load switch S2, and the third load switch S3. In this case, when the battery is used as an input and a voltage of the battery is used as the input voltage and applied to any one of the ports, the other ports are used as the output ports. The load switches corresponding to the output ports are controlled in a turn-on state. For example, when the voltage of the battery is applied to the third port Port 3, if the first port Port 1 is used as the output port, the first load switch S1 and/or the second load switch S2 is in the turn-on state to output the voltage at the first port Port 1 to the corresponding load; and if the second port Port 2 is used as the output port, the third load switch S3 is in the turn-on state to output the voltage at the second port Port 2 to the load connected to the third load switch S3.

In this embodiment, in an application scenario of charging the battery, the battery may be charged by selecting a suitable input port based on the magnitude of the input voltage. Hereinafter, description is given using the case where the battery is connected to the third port Port 3 as an example.

When a 5 V input voltage is applied to any one of the first load terminal, the second load terminal, and the third load terminal, the load switch correspondingly serving as an input is controlled to be turned on, and the other load switches are controlled to be turned off. For example, when the 5 V input voltage is applied to the first load terminal, the first load switch S1 is controlled to be turned on, and the second load switch S2 and the third load switch S3 are controlled to be turned off. In this case, the battery may be charged in the third operating mode. For details, reference may be made to the embodiment as illustrated in FIG. 5, which are not described herein any further. However, it may be understood that a charging voltage of the battery depends on the third duty cycle D3.

When a 6-12 V input voltage is applied to any one of the first load terminal, the second load terminal, and the third load terminal, the load switch correspondingly serving as an input is controlled to be turned on, and the other load switches are controlled to be turned off. For example, when the 6-12 V input voltage is applied to the first load terminal, the first load switch S1 is controlled to be turned on, and the second load switch S2 and the third load switch S3 controlled to be turned off. In this case, the battery may be charged in the second operating mode or the third operating mode. For details, reference may be made to the embodiment as illustrated in FIG. 2 or FIG. 3. The operating mode to be specifically employed depends on a charging state of the battery (a constant-current charging state or a constant-voltage charging state) and a specific input voltage value. It may be understood that when the battery is charged in the second operating mode, the charging voltage of the battery depends on the input voltage and the first duty cycle D1; and when the battery is charged in the third operating mode, the charging voltage of the battery depends on the input voltage and the third duty cycle D3.

When a 12-20 V input voltage is applied to any one of the first load terminal and the second load terminal, the load switch correspondingly serving as an input is controlled to be turned on, and the other load switch is controlled to be turned off. For example, when the 12-20 V input voltage is applied to the first load terminal, the first load switch S1 is controlled to be turned on, and the second load switch S2 and the third load switch S3 controlled to be turned off. In this case, the battery may be charged in the second operating mode or the third operating mode. For details, reference may be made to the embodiment as illustrated in FIG. 2 or FIG. 3. The operating mode to be specifically employed depends on a charging state of the battery (a constant-current charging state or a constant-voltage charging state) and a specific input voltage value.

When the battery is used as the input voltage at the third port Port 3, the voltage at the second port Port 2 is equal to a product of the voltage of the battery multiplied by 1/(1−D2), wherein D2 is the second duty cycle. The voltage at the first port Port 1 is equal to a double of the voltage at the second port Port 2. In this case, the corresponding load switch may be turned on or a desired reverse boosted voltage may be obtained according to actual needs.

In another aspect, an embodiment of the present disclosure provides a power conversion system. The power conversion system includes a power source, and the power conversion circuit 100 as described above (for example, the power conversion circuit as illustrated in FIG. 1, FIG. 4, or FIG. 6). The power conversion circuit 100 is connected to the power source. The power source may be a voltage source, a battery, or any other power source.

In still another aspect, an embodiment of the present disclosure provides a power chip. The power chip includes the power conversion circuit 100 as described above (for example, the power conversion circuit as illustrated in FIG. 1, FIG. 4, or FIG. 6).

It should be finally noted that the present disclosure may be implemented in different ways or forms, and the implementation is not limited to the embodiments described herein in the specification. These illustrated embodiments construe no extra limitation to the disclosure of the present disclosure. These embodiments are described only for better and thorough understanding of the disclosure of the present disclosure. In addition, based on the inventive concepts of the present disclosure, the above described technical features may be incorporated and combined with each other to derive various variations in different aspects of the present disclosure, and such derived variations shall all be deemed as falling within the scope of the disclosure contained in the specification of the present disclosure. Further, a person skilled in the art may make improvements or variations according to the above description, and such improvements or variations shall all fall within the protection scope as defined by the claims of the present disclosure.

Figure 9:
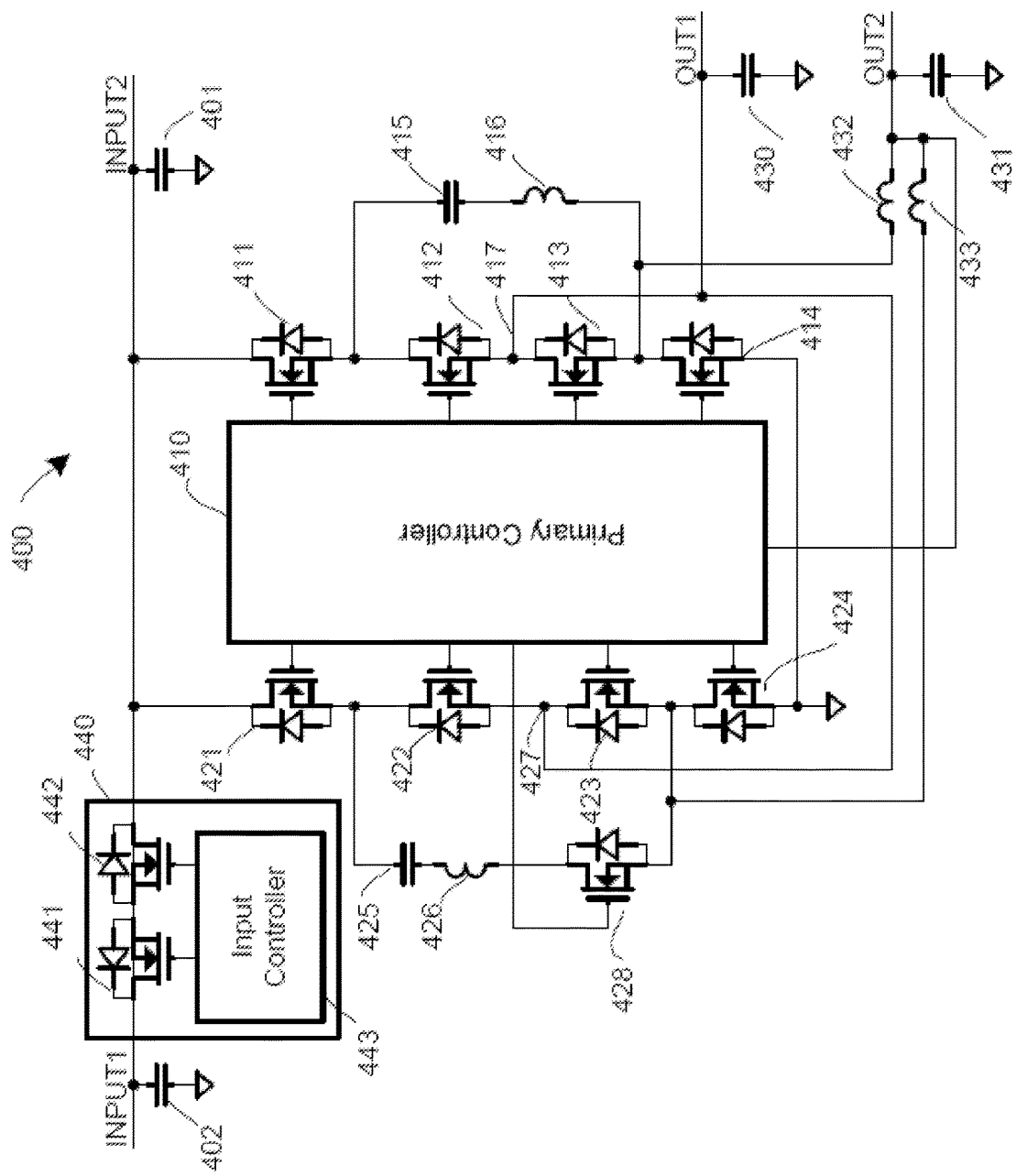
FIG. 9 is a schematic diagram of a single-stage conversion system having an input source selection function.
Figure 10:
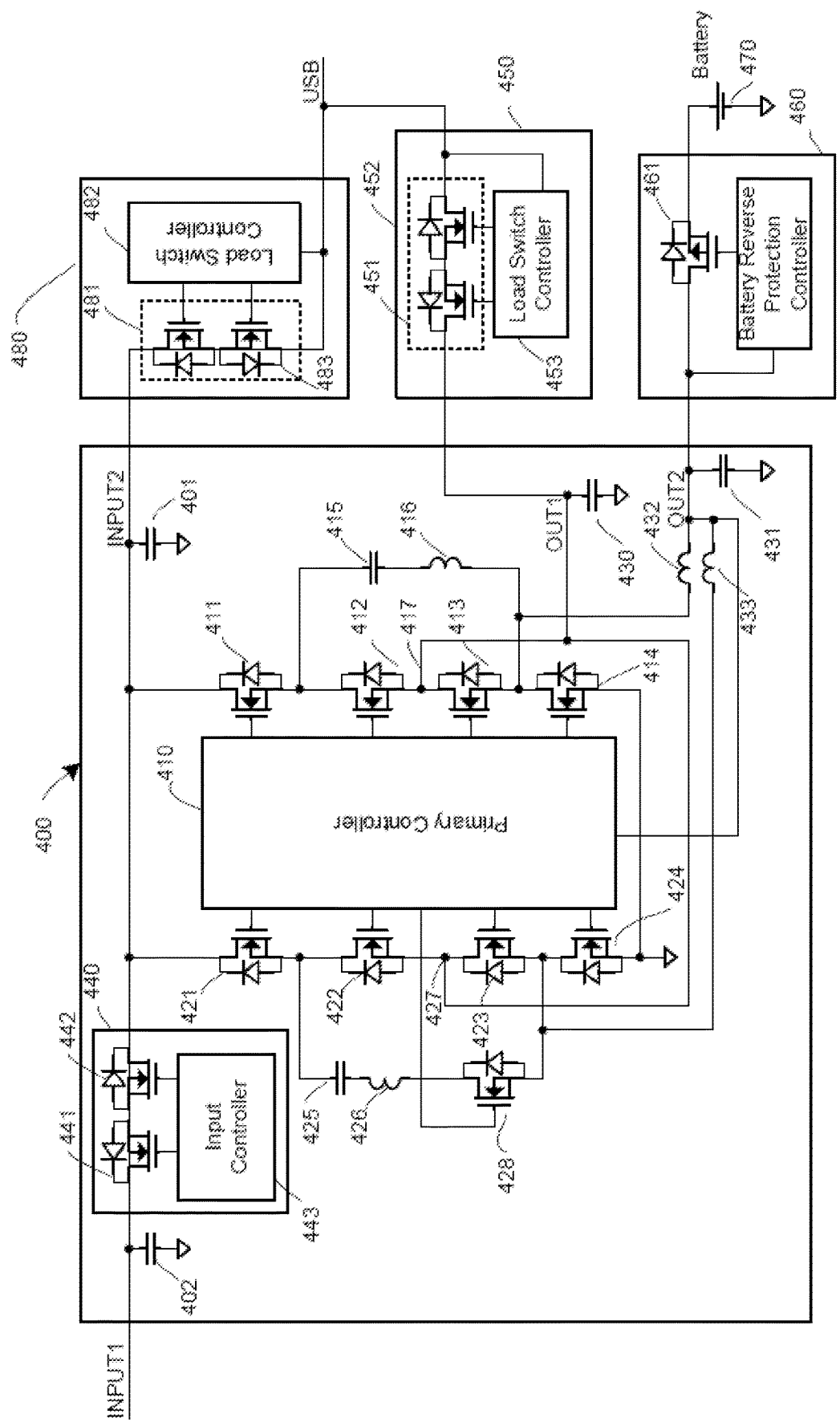
FIG. 10 is schematic diagram of the conversion system applied to a single cell battery charging system.

As another embodiment of the present invention, a DC/DC power conversion system, for example, a single-stage conversion system 400 having an input source selection function as illustrated in FIG. 9 is presented here. The single-stage conversion system 400 includes a first power switch circuitry and a second power switch circuitry, two sets of resonant units, a first output filter inductor, a second output filter inductor, a fifth power switch, a primary controller, and an input source selecting module 440. The conversion system has power inputs INPUT1 and INPUT2. The power inputs INPUT1 and INPUT2 are coupled to an input terminal of the single-stage conversion system 400 via the input source selecting module 440. The power input INPUT1 may be connected to an external input power source, for example, a wireless power source, via a decoupling capacitor 402. The power input INPUT2 may be coupled to another power source, for example, a USB power source, via a decoupling capacitor 401. The two sets of resonant units act on the first power switch circuitry and the second power switch circuitry, and the two sets of resonant units include a resonant capacitor 415 and a resonant capacitor 425, a resonant inductor 416 and a resonant inductor 426. The first power switch circuitry includes four power switches that are connected in series. That is, MOSFETs 411, 412, 413, and 414 as illustrated in FIG. 9 constitute a first power switch 411, a second power switch 412, a third power switch 413, and a fourth power switch 414 of the first power switch circuitry. One terminal of the resonant capacitor 415 in a first set of resonant units is coupled between the first power switch 411 and the second power switch 412, the other terminal of the resonant capacitor 415 is coupled to one terminal of the resonant inductor 416, and the other terminal of the resonant inductor 416 is coupled between the third power switch 413 and the fourth power switch 414. The second power switch circuitry includes four power switches that are connected in series. That is, MOSFETs 421, 422, 423, and 424 as illustrated in FIG. 10 constitute a first power switch 421, a second power switch 422, a third power switch 423, and a fourth power switch 424 of the second power switch circuitry. One terminal of the resonant capacitor 425 in a second set of resonant units is coupled between the first power switch 421 and the second power switch 422, the other terminal of the resonant capacitor 425 is coupled to one terminal of the resonant inductor 426, and the other terminal of the resonant inductor 426 is coupled between the third power switch 423 and the fourth power switch 424 via a fifth power switch 428 (the fifth power switch is a MOSFET). A first center point 417 of the first power switch circuitry and a second center point 427 of the second power switch circuitry are coupled and form a first output OUT1 through the first output filter capacitor. That is, the first center point 417 is disposed between the second power switch 412 and the third power switch 413 of the first power switch circuitry; and the second center point 427 is disposed between the second power switch 422 and the third power switch 423 of the first power switch circuitry. In addition, the resonant inductor 416 of the first set of resonant units is coupled to the first output filter inductor 423, and the resonant inductor 426 of the second set of resonant units is coupled to the second output filter inductor 433 via the fifth power switch 428.

The second output filter capacitor 431 is coupled in series to the first output filter inductor 432 and the second output filter inductor 433, such that the first output filter inductor 432 and the second output filter inductor 433 form a second output OUT2 through the second output filter capacitor 431. Meanwhile, the second output is fed back to the primary controller 410.

Referring to FIG. 9, operating principles of the single-stage conversion system 400 are further described. By introducing two sets of resonant units, currents flowing through the resonant capacitor 415 and the resonant capacitor 425 are changed from a quasi-square wave to a half-cycle sine wave. The half-cycle sine wave causes the first power switch 411 and the second power switch 412 of the first power switch circuitry, and the first power switch 421 and the second power switch 422 of the second power switch circuitry to be turned on and turned off at zero current, such that switching loss is reduced and high-frequency operation is implemented, and inductance values for the resonant inductor 416 and the resonant inductor 426, and the first output filter inductor 432 and the second output filter inductor 433 are decreased. As compared with capacitance values of the switch capacitors used in a conventional charge pump circuit, capacitance values of the resonant capacitors are much smaller. Smaller capacitance values allow use of resonant capacitors having smaller dimensions, and thus the dimensions of the elements and the PCB are reduced.

The input source selecting module 440 includes two power switches (comprising the MOSFET 441 and 442) that are connected back-to-back, and an input controller 443. The input source selecting module 440 is capable of operating in three modes: a constant current (CC mode), a constant voltage (CV) mode, and a bypass (BP) mode. In the CC mode, a current flowing through the power switch 441 is strictly regulated according to a reference current. In the CV mode, a voltage at a right side of the power switch 422 is strictly regulated according to a reference voltage. In the BP mode, the power switches 441 and 442 are both driven to a totally enable state.

Further, the power input INPUT1 may be connected to a USB or a wireless power source. When the power input INPUT1 is connected to a power source, the input source selecting module 440 is capable of operating in any of the above three modes.

Further, the power input INPUT2 may be connected to a USB or a wireless power source. When the power input INPUT2 is connected to a power source, the input source selecting module 440 is in a turn-off state.

The first output OUT1 constantly operates in an open-loop mode, whereas the second output OUT2 may operate in an open-loop mode or a closed-loop mode by virtue of an OUT2 feedback controller of the primary controller 410.

The first power switch 411 and the third power switch 413 of the first power switch circuitry are controlled by a first duty control signal, and the second power switch 412 and the fourth power switch 414 of the first power switch circuitry are controlled by a second duty control signal. The second power switch circuitry includes at least four power switches that are connected in series; wherein the first power switch 421 and the third power switch 423 of the second power switch circuitry are controlled by a third duty control signal, and the second power switch 422 and the fourth power switch 424 of the second power switch circuitry are controlled by a fourth duty control signal. The first duty control signal and the second duty control signal are complementary drive signals. The first duty control signal and the third duty control signal are 180 degrees out of phase from each other.

Accordingly, in this embodiment, when the first power switch circuitry and the second power switch circuitry operate out of phase at a duty cycle of 50%, the OUT2 feedback controller of the primary controller 410 is in a turn-off state. In this operating mode, voltage conversion ratios of the power input INPUT2 relative to voltages of the first output OUT1 and the second output OUT2 are 4:2 and 4:1 respectively. In practice, due to impacts caused by resistances of the MOSFET and PCB wiring, the conversion ratios are slightly higher. Therefore, the single-stage conversion system 400 is capable of providing two outputs. In addition, during operation of the single-stage conversion system 400, the fifth power switch 428 is constantly in a turn-on state.

In this embodiment, the first power switch circuitry and the second power switch circuitry can be configured to operate out of phase at any duty cycle between 0% and 100%, and meanwhile an OUT2 regulation controller of the primary controller 410 is enabled. In this operating mode, regardless of the actual duty cycle of the MOSFET, the voltage conversion ratio of the power input INPUT2 relative to the first output OUT1 is constantly 4:2. However, a voltage or a current of the second output OUT2 is controlled by an output reference voltage or an output reference current thereof. In practice, due to impacts caused by resistances of the MOSFET and PCB wiring, the voltage conversion ratio of the power input INPUT2 relative to the first output OUT1 may be slightly higher. However, the impacts caused by resistances of the MOSFET and the PCB wiring may be removed for the second output OUT2 by the regulation controller, such that the voltage or the current of the second output OUT2 remains constant. In this operating mode, the fifth power switch 428 is constantly in the turn-on state.

In this embodiment, during certain mode of operations, the first power switch 411 and the second power switch 412 of the first power switch circuitry remain turned on, whereas the third power switch 413 and the fourth power switch 414 of the first power switch circuitry, the first power switch 421 and the second power switch 422 of the second power switch circuitry, and the fifth power switch 428 remain turned off. The third power switch 423 and the fourth power switch 424 of the second power switch circuitry operate at a complementary duty cycle between 0% and 100%. In this way, the regulation controller of the second output OUT2 is enabled to regulate the voltage or the current of the second output OUT2. This operating mode is referred to as single phase buck mode. In this operating mode, the voltage conversion ratio of the power input INPUT2 relative to the first output OUT1 is constantly 1:1. The second output OUT2 is strictly controlled within the range of the reference voltage or the reference current thereof. In practice, due to impacts caused by resistances of the MOSFET and PCB wiring, the voltage conversion ratio of the power input INPUT2 relative to the first output OUT1 may be slightly higher. However, the impacts caused by resistances of the MOSFET and the PCB wiring may be removed for the second output OUT2 by the regulation controller, such that the voltage or the current of the second output OUT2 remains constant.

In this embodiment, the first power switch circuitry and the second power switch circuitry can be configured to operate in a bypass mode relative to the first output OUT1. In this operating mode, the first power switch 411, the second power switch 412, and the fourth power switch 414 of the first power switch circuitry, and the first power switch 421, the second power switch 422, and the fourth power switch 424 of the second power switch circuitry remain turned on; whereas the third power switch 413 of the first power switch circuitry, the third power switch 423 of the second power switch circuitry, and the fifth power switch 428 remain turned off. In this operating mode, the second output OUT2 is unavailable.

In this embodiment, the first power switch circuitry and the second power switch circuitry can be configured to operate in the bypass mode relative to the second output OUT2. Under this mode, the first power switch 411, the second power switch 412, and the third power switch 413 of the first power switch circuitry, and the first power switch 421, the second power switch 422, and the third power switch 423 of the second power switch circuitry remain turned on; whereas the fourth power switch 414 of the first power switch circuitry, the fourth power switch 424 of the second power switch circuitry, and the fifth power switch 428 remain turned off. In this operating mode, the voltage of the first output OUT1 is equal to the voltage of the second output OUT2.

In this embodiment, the first power switch circuitry and the second power switch circuitry can be configured to operate out of phase at a duty cycle of 50%, and the second output OUT2 is used as an input. This operation is referred to as reverse charge pump mode or boost mode. The voltage of the power input INPUT2 is equal to the double of the voltage of the first output OUT1, and is equal to the quadruple of the voltage of the second output OUT2, if the OUT2 regulation controller is disabled. In this operating mode, the voltage conversion ratios of the first output OUT1 and the second output OUT2 relative to the power input INPUT2 are 2:4 and 1:4 respectively. In practice, due to impacts caused by resistances of the MOSFET and PCB wiring, the conversion ratios are slightly lower.

In this embodiment, the power input INPUT2 can be used as an output while the second output OUT2 is used as an input. The first power switch circuitry and the second power switch circuitry operate out of phase at a duty cycle between 0% and 100%, and the OUT2 regulation controller controls an output voltage of the power input INPUT2. This operating mode is referred to as reverse boost mode. The voltage of the power input INPUT2 is equal to the double of the voltage of the first output OUT1. In this operating mode, the voltage of the power input INPUT2 is controlled by the OUT2 regulation controller to be between the voltage of the battery and the voltage rating of the first power switch 411 and the second power switch 421 of the first power switch circuitry.

In this embodiment, the first output OUT1 can be used as an output, while the second output OUT2 is used as an input, and the first power switch 411 and the second power switch 412 of the first power switch circuitry remain turned on, whereas the third power switch 413 and the fourth power switch 414 of the first power switch circuitry, the first power switch 421 and the second power switch 422 of the second power switch circuitry, and the fifth power switch 428 remain turned off. The third power switch 423 and the fourth power switch 424 of the second power switch circuitry operate at a complementary duty cycle between 0% and 100%, and the OUT2 regulation controller is enabled to regulate the voltage of the first output OUT1. This operating mode is referred to as single-phase reverse boost mode. In this operating mode, the voltage conversion ratio of the power input INPUT2 relative to the first output OUT1 is constantly 1:1. However, the voltage of the first output OUT1 is controlled by the OUT2 regulation controller to be between the voltage of the battery and the voltage rating of the third power switch 413 of the first power switch circuitry and the third power switch 423 of the second power switch circuitry. In practice, due to impacts caused by resistances of the MOSFET and PCB wiring, the voltage conversion ratio of the power input INPUT2 relative to the first output OUT1 may be slightly lower. However, the output voltage of the first output OUT1 may be caused to remain constant by the OUT2 regulation controller.

In this embodiment, the first power switch circuitry and the second power switch circuitry can be configured to operate in the bypass mode with the first output OUT1 as an input power source. This bypass mode is referred to as reverse bypass mode. In the reverse bypass mode, the first power switch 411, the second power switch 412, and the fourth power switch 414 of the first power switch circuitry, and the first power switch 421, the second power switch 422, and the fourth power switch 424 of the second power switch circuitry remain turned on; whereas the third power switch 413 of the first power switch circuitry, the third power switch 423 of the second power switch circuitry, and the fifth power switch 428 remain turned off. In this reverse bypass mode, the voltage of the power input INPUT2 is equal to the voltage of the first output OUT1, and the second output OUT2 is disabled.

In this embodiment, the first power switch circuitry and the second power switch circuitry can be configured to operate in the bypass mode with the second output OUT2 as an input power source. This bypass mode is referred to as reverse bypass mode. In the reverse bypass mode, the first power switch 411, the second power switch 412, and the third power switch 413 of the first power switch circuitry, and the first power switch 421, the second power switch 422, and the third power switch 423 of the second power switch circuitry remain turned on; whereas the fourth power switch 414 of the first power switch circuitry, the fourth power switch 424 of the second power switch circuitry, and the fifth power switch 428 remain turned off. In this reverse bypass mode, the voltage of the first output OUT1 is equal to the voltage of the second output OUT2, and is equal to the voltage of the power input INPUT2. Referring to FIG. 10, an embodiment where the single-stage conversion system 400 as illustrated in FIG. 9 is used in a single cell battery charging system is illustrated. As illustrated in FIG. 10, the power input INPUT2 of the single-stage conversion system 400 is coupled to a load switch module 480. The first output OUT1 of the single-stage conversion system 400 is coupled to a load switch module 450. The second output OUT2 of the single-stage conversion system 400 is coupled to a single cell battery via a battery reverse protection control module.

In this embodiment, the load switch module 480 includes two MOSFETS 481 and 483 that are connected back-to-back, and a load switch controller 482. In this embodiment, the load switch module 450 includes two MOSFETS 451 and 452 that are connected back-to-back, and a load switch controller 453. In this embodiment, the battery reverse protection control module includes a MOSFET 461 and a battery reverse protection controller 460. When the MOSFET 461 is set by the battery reverse protection controller 460 to a turn-off state, the MOSFET 461 prevents the battery from being discharged.

In the embodiment as illustrated in FIG. 10, the power input INPUT1 is used as an input source (for example, a wireless power source) to charge the battery. In this operating mode, the input source selecting module 440 operates in the bypass mode, and the single-stage conversion system 400 operates at a duty cycle of 50% or lower, such that the OUT2 regulation controller is enabled to charge the battery in a charging mode of the pre-charging mode, the CC mode, or the CV mode. The load switch modules 480 and 450 are disabled. The MOSFET 461 of the battery reverse protection control module is set to a turn-on state. Under this circumstance, the voltage of the power input INPUT1 may reach 20 V.

In the embodiment as illustrated in FIG. 10, the power input INPUT1 can be used as an input source (for example, a wireless power source having only a 5 V output) to charge the battery, and the voltage of the wireless power source is only 5 V. In this operating mode, the input source selecting module 440 operates in the bypass mode, and the single-stage conversion system 400 operates in a buck mode, such that the OUT2 regulation controller is enabled to charge the battery in a charging mode of the pre-charging mode, the CC mode, or the CV mode. The load switch modules 480 and 450 are disabled. The MOSFET 461 of the battery reverse protection control module is set to a turn-on state.

In the embodiment as illustrated in FIG. 10, the power input INPUT2 can be used as an input source (for example, a USB power source) to charge the battery. In this operating mode, the load switch module 480 operates in the bypass mode, and the single-stage conversion system 400 operates at a duty cycle of 50% or lower, such that the OUT2 regulation controller is enabled to charge the battery in a charging mode of the pre-charging mode, the CC mode, or the CV mode. The input source selecting module 440 and the load switch module 450 are disabled. The MOSFET 461 of the battery reverse protection control module is set to the turn-on state. Under this circumstance, a maximum voltage of the USB power source may be up to 20 V.

In the embodiment as illustrated in FIG. 10, the first output OUT1 can be used as an input source (for example, a USB power source) to charge the battery. In this operating mode, the load switch module 450 operates in the bypass mode, and the single-stage conversion system 400 operates at a duty cycle between 0% and 100% in the buck mode, such that the OUT2 regulation controller is enabled to charge the battery in a charging mode of the pre-charging mode, the CC mode, or the CV mode. The input source selecting module 440 and the load switch module 480 are disabled. The MOSFET 461 of the battery reverse protection control module is set to the turn-on state. Under this circumstance, a maximum voltage of the USB power source may be up to 10V.

In the embodiment as illustrated in FIG. 10, the first output OUT1 can be used as an input source (for example, a USB power source) to charge the battery, and the voltage of the USB power source is only 5 V, for example, a USB dedicated charging port (DCP) adapter. In this operating mode, the load switch module 450 operates in the bypass mode, and the single-stage conversion system 400 operates in the buck mode, such that the OUT2 regulation controller is enabled to charge the battery in a charging mode of the pre-charging mode, the CC mode, or the CV mode. The input source selecting module 440 and the load switch module 480 are disabled. The MOSFET 461 of the battery reverse protection control module is set to the turn-on state.

In the embodiment as illustrated in FIG. 10, the first output OUT1 can be used as an input source (for example, a USB power source) to charge the battery, and the voltage of the USB power source is only 5 V, for example, a USB adapter having an output regulatable from 3.5 V to 5.5 V. In this operating mode, the load switch module 450 operates in the bypass mode relative to the first output OUT1, the single-stage conversion system 400 operates in the bypass mode relative to the second output OUT2, and the OUT2 regulation controller is disabled. The input source selecting module 440 and the load switch module 480 are disabled. The MOSFET 461 of the battery reverse protection control module is set to the turn-on state. This charging mode is also referred to as a direct-charging mode.

In the embodiment as illustrated in FIG. 10, the power input INPUT1 can be used as an output to supply power to an additional device, for example, a wireless transmitter with an input coupled to the power input INPUT1. In this operating mode, the input source selecting module 440 operates in the bypass mode, and the single-stage conversion system 400 operates in the reverse boost mode, such that the OUT2 regulation controller is enabled to control the voltage of the power input INPUT1. The load switch modules 480 and 450 are disabled. The MOSFET 461 of the battery reverse protection control module is set to the turn-on state. The output voltage is supplied by a battery 470. The voltage of the power input INPUT1 may be regulated as desired between the voltage of the battery and the voltage rating of the MOSFET.

In the embodiment as illustrated in FIG. 10, the power input INPUT1 can be used as an output to supply power to an additional device, for example, a wireless transmitter with an input coupled to the power input INPUT1. In this operating mode, the input source selecting module 440 operates in the bypass mode, the single-stage conversion system 400 operates at a duty cycle of 50%, and the OUT2 regulation controller is disabled. The single-stage conversion system 400 operates in the reverse charge pump mode, and the voltage of the power input INPUT1 is equal to the double of the voltage of the first output OUT1, and is equal to the quadruple of the voltage of the battery. The load switch modules 480 and 450 are disabled. The MOSFET 461 of the battery reverse protection control module is set to the turn-on state. The output power is supplied by the battery 470.

In the embodiment as illustrated in FIG. 10, the power input INPUT1 can be used as an output to supply power to an additional device, for example, a wireless transmitter with an input coupled to the power input INPUT1. In this operating mode, the input source selecting module 440 operates in the bypass mode, the single-stage conversion system 400 operates in the reverse bypass mode, and the OUT2 regulation controller is disabled. The load switch modules 480 and 450 are disabled. The MOSFET 461 of the battery reverse protection control module is set to the turn-on state. The output power is supplied by the battery 470. The voltage of the power input INPUT1 is equal to the voltage of the battery.

In the embodiment as illustrated in FIG. 10, the power input INPUT2 can be used as an output to supply power to an additional device connected to the power input INPUT2. In this operating mode, the load switch module 480 operates in the bypass mode, and the single-stage conversion system 400 operates at a duty cycle between 0% and 100%, such that the OUT2 regulation controller is enabled to control the voltage of the power input INPUT2. The conversion system operates in the reverse boost mode. The input source selecting module 440 and the load switch module 450 are disabled. The MOSFET 461 of the battery reverse protection control module is set to the turn-on state. The output power is supplied by the battery 470. The voltage of the power input INPUT2 may be regulated as desired between the voltage of the battery and the voltage rating of the first power switch 411 of the first power switch circuitry and the first power switch 421 of the second power switch circuitry.

In the embodiment as illustrated in FIG. 10, the power input INPUT2 can be used as an output to supply power to an additional device, for example, a USB on-the-go (OTG) output. In this operating mode, the load switch module 480 operates in the bypass mode, the single-stage conversion system 400 operates at a duty cycle of 50%, and the OUT2 regulation controller is disabled. The conversion system operates in the reverse charge pump mode, the voltage of the power input INPUT2 is equal to the double of the voltage of the first output OUT1, and is equal to the quadruple of the voltage of the battery. The load switch modules 480 and 450 are disabled. The MOSFET 461 of the battery reverse protection control module is set to the turn-on state. The output power is supplied by the battery 470.

In the embodiment as illustrated in FIG. 10, the power input INPUT2 can be used as an output to supply power to an additional device, for example, a USB OTG output. In this operating mode, the switch lode module 480 operates in the bypass mode, and the single-stage conversion system 400 operates in the reverse bypass mode, such that the OUT2 regulation controller is disabled. The load switch modules 480 and 450 are disabled. The MOSFET 461 of the battery reverse protection control module is set to the turn-on state. The output power is supplied by the battery 470. The voltage of the power input INPUT2 is equal to the voltage of the battery.

In the embodiment as illustrated in FIG. 10, the first output OUT1 can be used as an output to supply power to an external additional device via the load switch module 450. In this operating mode, the load switch module 450 operates in the bypass mode, the single-stage conversion system 400 operates at a duty cycle of 50% in the reverse charge pump mode, and the OUT2 regulation controller is disabled. The input source selecting module 440 and the load switch module 480 are disabled. The MOSFET 461 of the battery reverse protection control module is set to the turn-on state. The output power is supplied by the battery 470. The voltage of the first output OUT1 is constantly equal to the double of the voltage of the battery.

In the embodiment as illustrated in FIG. 10, the first output OUT1 can be used as an output to supply power to an additional device connected to the first output OUT1 via the load switch module 450. In this operating mode, the load switch module 450 operates in the bypass mode, the single-stage conversion system 400 also operates in the reverse bypass mode, and the OUT2 regulation controller is disabled. The input source selecting module 440 and the load switch module 480 are disabled. The MOSFET 461 of the battery reverse protection control module is set to the turn-on state. The output power is supplied by the battery 470. The voltage of the first output OUT1 is equal to the voltage of the battery.

In the embodiment as illustrated in FIG. 10, the first output OUT1 can be used as an output to supply power to an additional device connected to the first output OUT1. In this operating mode, the load switch module 480 operates in the bypass mode, and the single-stage conversion system 400 operates at a duty cycle between 0% and 100%, such that the OUT2 regulation controller is enabled to control the voltage of the first output OUT1. The conversion system operates in the single-phase reverse boost mode. The input source selecting module 440 and the load switch module 450 are disabled. The MOSFET 461 of the battery reverse protection control module is set to the turn-on state. The output power is supplied by the battery 470. The voltage of the first output OUT1 is regulated as desired between the voltage of the battery and the voltage rating of the third power switch 413 of the first power switch circuitry and the third power switch 423 of the second power switch circuitry.

Figure 11:
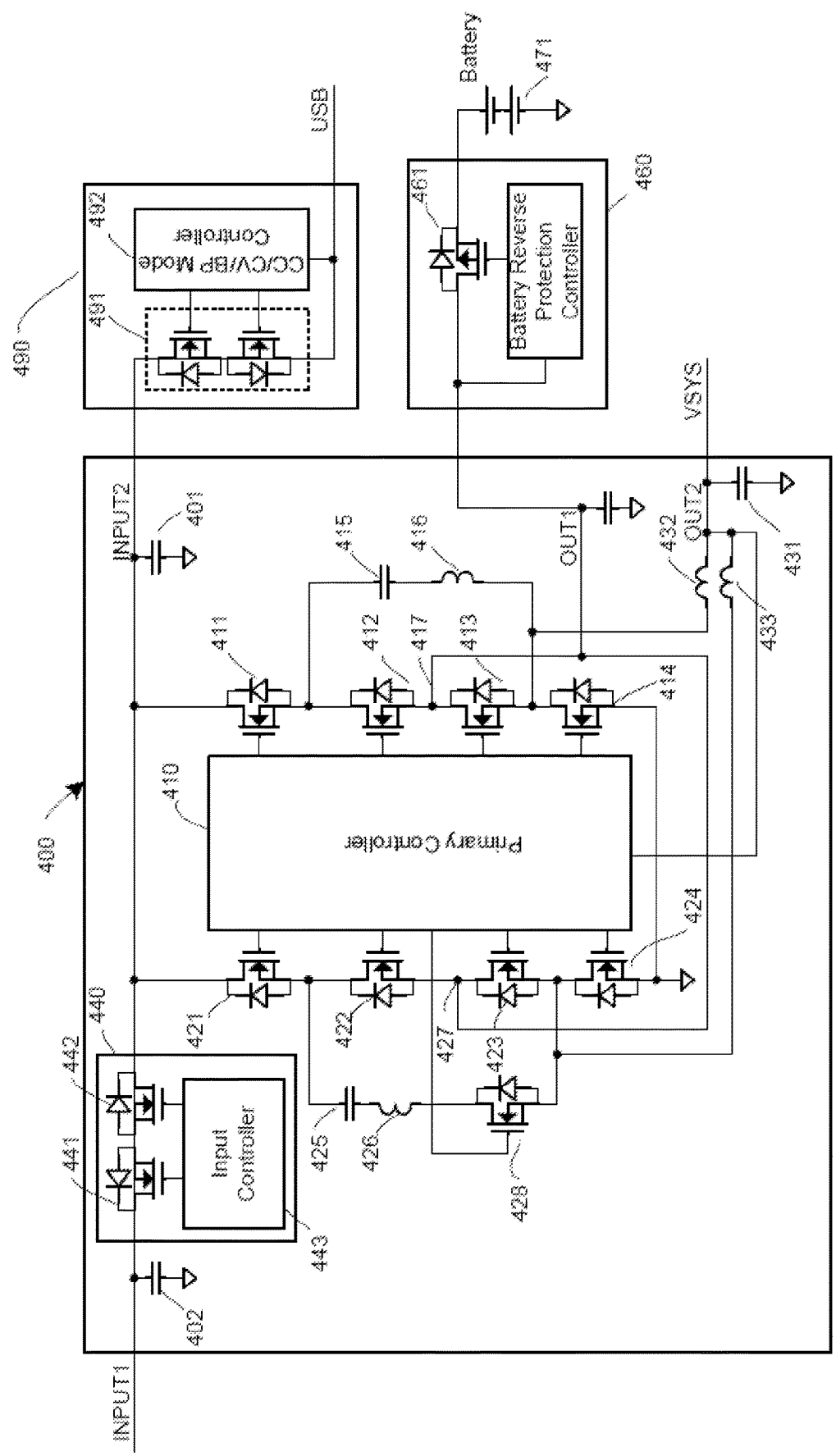
FIG. 11 is schematic diagram of the conversion system applied to a double cell-battery charging system.

Referring to FIG. 11, an embodiment where the single-stage conversion system 400 as illustrated in FIG. 9 is used in a double cell battery charging system is illustrated. The power input INPUT2 of the single-stage conversion system 400 is coupled to an input source selecting module 490. The first output OUT1 of the single-stage conversion system 400 is coupled to a battery set 471 including double cell batteries via a battery reverse protection control module. The second output OUT2 of the single-stage conversion system 400 is coupled to the second filter capacitor 431 to supply power to the system.

In this embodiment, the input source selecting module 490 includes two MOSFETs 491 that are connected back-to-back, and a CC/CV/BP mode controller 492. In this embodiment, the battery reverse protection control module includes a MOSFET 461 and a battery reverse protection controller 460. When the MOSFET 461 is set by the battery reverse protection controller 460 to the turn-off state, the MOSFET 461 prevents the battery from being discharged.

In an embodiment of the double cell battery charging system as illustrated in FIG. 11, the power input INPUT1 can be used as a power source (for example, a wireless power source) to charge the battery. In this operating mode, the input source selecting module 440 operates in a charging mode of the CC mode, the CV mode, or the BP mode. The single-stage conversion system 400 operates at a duty cycle of 50%, and the OUT2 regulation controller is disabled. The input source selecting module 490 is disabled. The MOSFET 461 of the battery reverse protection control module is set to the turn-on state. The voltage of the first output OUT1 is equal to the half of the voltage of the power input INPUT1. The voltage of the second output OUT2 is equal to the half of the voltage of the first output OUT1. The first output OUT1 charges the battery set including double cell batteries via the battery reverse protection control module. The second output OUT2 supplies power to the system. The voltage of the power input INPUT1 may be up to 20 V.

In an embodiment of the double cell battery charging system as illustrated in FIG. 11, the power input INPUT1 can be used as a power source (for example, a wireless power source) to charge the battery set including double cell batteries. In this operating mode, the input source selecting module 440 operates in the bypass mode, the single-stage conversion system 400 operates in the buck mode, and the OUT2 regulation controller is enabled. The input source selecting module 490 is disabled, and the MOSFET 461 of the battery reverse protection control module is set to the turn-on state. The voltage of the first output OUT1 approaches the voltage of the power input INPUT1 (bypass) and charges the battery set including double cell batteries. The output voltage of the second output OUT2 is controlled based on the reference voltage of the OUT2 regulation controller. The second output OUT2 supplies power to the system. The voltage of the power input INPUT1 may be up to 10V.

In an embodiment of the double cell battery charging system as illustrated in FIG. 11, the power input INPUT2 can be used as a power source (for example, a USB power source) to charge the battery set including double cell batteries. In this operating mode, the input source selecting module 490 operates in a charging mode of the CC mode, the CV mode, or the BP mode. The single-stage conversion system 400 operates at a duty cycle of 50% or higher, and the OUT2 regulation controller is enabled. The input source selecting module 440 is disabled, and the MOSFET 461 of the battery reverse protection control module is set to the turn-on state. The voltage of the first output OUT1 is equal to the half of the voltage of the power input INPUT2, and charges the battery set including double cell batteries via the battery reverse protection controller 460. The voltage of the second output OUT2 is equal to the half of the voltage of the first output OUT1 or higher, which specifically depends on the reference voltage set for regulation of the second output OUT2. The second output OUT2 supplies power to the system. The voltage of the power input INPUT1 may be up to 20 V.

In an embodiment of the double cell battery charging system as illustrated in FIG. 11, the power input INPUT2 can be used as a power source (for example, a USB power source) to charge the battery set including double cell batteries. In this operating mode, the input source selecting module 490 operates in the CC mode, the CV mode, or the BP mode, the single-stage conversion system 400 operates at a duty cycle of 50%, and the OUT2 regulation controller is disabled. The input source selecting module 440 is disabled, and the MOSFET 461 of the battery reverse protection control module is set to the turn-on state. The voltage of the first output OUT1 is equal to the half of the voltage of the power input INPUT2, and charges the battery set including double cell batteries via the battery reverse protection controller 460. The voltage of the second output OUT2 is equal to the half of the voltage of the first output OUT1, and supplies power to the system. The voltage of the power input INPUT2 may be up to 20 V.

In an embodiment of the double cell battery charging system as illustrated in FIG. 11, the power input INPUT2 can be used as an input power source (for example, a USB power source) to charge the battery set including double cell batteries. In this operating mode, the input source selecting module 490 operates in the bypass mode, the single-stage conversion system 400 also operates in the buck mode, and the OUT2 regulation controller is enabled. The input source selecting module 440 is disabled. The MOSFET 461 of the battery reverse protection control module is set to the turn-on state. The voltage of the first output OUT1 is equal to the voltage of the power input INPUT2, and directly charges the battery set including double cell batteries. The voltage of the second output OUT2 is equal to the half of the voltage of the first output OUT1 or higher, which specifically depends on the reference voltage set for regulation of the second output OUT2. The second output OUT2 supplies power to the system. The voltage of the power input INPUT1 may be up to 10V.

In an embodiment of the double cell battery charging system as illustrated in FIG. 11, the power input INPUT1 can be used as an output to charge an additional device, for example, a wireless transmitter connected to the power input INPUT1. In this operating mode, the input source selecting module 440 operates in the bypass mode with a current limiting function, the single-stage conversion system 400 operates at a duty cycle between 0% and 100%, and the OUT2 regulation controller is enabled to control the voltage of the second output OUT2. The single-stage conversion system 400 operates in the reverse charge pump mode. The input source selecting module 490 is disabled. The MOSFET 461 of the battery reverse protection control module is set to the turn-on state. The voltage of the power input INPUT1 is equal to the double of the voltage of the first output OUT1, and is power-supplied by the battery set 471 including double cell batteries. The voltage (the system voltage) of the second output OUT2 is controlled the OUT2 regulation controller, and is power-supplied by the battery set 471 including double cell batteries.

In the embodiment as illustrated in FIG. 11, the power input INPUT2 can be used as an output to supply power to other devices connected to the power input INPUT2. In this operating mode, the input source selecting module 490 operates in the bypass mode with the current limiting function, the single-stage conversion system 400 operates at a duty cycle between 0% and 100%, and the OUT2 regulation controller controls the voltage of the second output OUT2. The single-stage conversion system 400 operates in the reverse charge pump mode. The input source selecting module 440 is disabled. The MOSFET 461 of the battery reverse protection control module is set to the turn-on state. The voltage of the power input INPUT2 is equal to the double of the voltage of the first output OUT1, and is power-supplied by the battery set 471 including double cell batteries. The voltage (the system voltage) of the second output OUT2 is controlled the OUT2 regulation controller, and is power-supplied by the battery set 471 including double cell batteries.

In the embodiment as illustrated in FIG. 11, the power input INPUT2 can be used as an output to supply power to an additional device coupled to the power input INPUT2. In this operating mode, the input source selecting module 490 operates in the bypass mode with the current limiting function, the single-stage conversion system 400 operates at a duty cycle between 0% and 100% in the buck mode, and the OUT2 regulation controller controls the voltage of the second output OUT2. The input source selecting module 440 is disabled. The MOSFET 461 of the battery reverse protection control module is set to the turn-on state. The voltage of the power input INPUT2 is equal to the double of the voltage of the battery, and is power-supplied by the battery set 471 including double cell batteries. The voltage (the system voltage) of the second output OUT2 is controlled the OUT2 regulation controller, and is power-supplied by the battery set 471 including double cell batteries.

Described above are merely exemplary embodiments of the present disclosure, which construe no limitation to the present disclosure. Any person skilled in the art would derive more possible variations, polishments, or modifications to the technical solution based on the content of the present disclosure without departing from the scope of the technical solution of the present disclosure. These variations, polishments, or modifications are all considered as equivalent embodiments of the present disclosure. Any content within the technical solution of the present disclosure, and any equivalent replacements made based on the inventive concept of the present disclosure shall all be considered as falling within the protection scope of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a first group of switches connected in series between a first voltage bus and a second voltage bus, wherein the second voltage bus is connected to ground;
a second group of switches connected in series between the first voltage bus and the second voltage bus;
a first flying capacitor between a first common node and a third common node of the first group of switches;
a second flying capacitor between a first common node and a third common node of the second group of switches;
a first port coupled to the first voltage bus;
a second port coupled to a second common node of the first group of switches and a second common node of the second group of switches; and
a third port coupled to a last common node of the first group of switches and a last common node of the second group of switches, wherein the first group of switches and the second group of switches are configured such that the apparatus operates in one of three operating modes including a bypass operating mode, a hybrid operating mode and a boost/buck operating mode, and wherein in the bypass operating mode, two upper switches of the first group and two upper switches of the second group are configured as always-on switches, and a last switch of the first group and a last switch of the second group are configured as always-off switches, and wherein a voltage on the first port is equal to a voltage on the second port, and a voltage on the third port is equal to the voltage on the second port.

2. The apparatus of claim 1, wherein:
in the hybrid operating mode, a first switch and a third switch of the first group are controlled by a first gate drive signal having a duty cycle D;
a first switch and a third switch of the second group are controlled by a second gate drive signal having the duty cycle D, and wherein the first gate drive signal and the second gate drive signal are 180 degrees out of phase from each other;
a second switch and a last switch of the first group are controlled by a third gate drive signal, and wherein the first gate drive signal and the third gate drive signal are two complementary signals; and
a second switch and a last switch of the second group are controlled by a fourth gate drive signal, and wherein the second gate drive signal and the fourth gate drive signal are two complementary signals; and wherein:
a ratio of a voltage on the first port to a voltage on the second port is 2:1; and
a ratio of the voltage on the second port to a voltage on the third port is 1:D.

3. The apparatus of claim 1, wherein:
in the boost/buck operating mode, two upper switches of the first group are configured as always-on switches;
a switch immediately adjacent to a last switch of the first group is controlled by a fifth gate drive signal having a duty cycle D;
a last switch of the first group is controlled by a sixth gate drive signal, and wherein the fifth gate drive signal and the sixth gate drive signal are two complementary signals, and wherein:
a ratio of a voltage on the first port to a voltage on the second port is 1:1; and
a ratio of the voltage on the second port to a voltage on the third port is 1:D.

4. The apparatus of claim 1, further comprising:
a first inductor connected between the last common node of the first group of switches and the third port; and
a second inductor connected between the last common node of the second group of switches and the third port.

5. The apparatus of claim 1, further comprising:
a third inductor connected in series with the first flying capacitor; and
a fourth inductor connected in series with the second flying capacitor.

6. The apparatus of claim 1, wherein:
the first group of switches comprise a first switch, a second switch, a third switch, a fourth switch and a fifth switch connected in series between the first voltage bus and the second voltage bus; and
the second group of switches comprise a sixth switch, a seventh switch, an eighth switch, a ninth switch and a tenth switch connected in series between the first voltage bus and the second voltage bus.

7. The apparatus of claim 6, wherein:
the first common node of the first group of switches is a common node of the first switch and the second switch;
the second common node of the first group of switches is a common node of the second switch and the third switch;
the third common node of the first group of switches is a common node of the third switch and the fourth switch;
the last common node of the first group of switches is a common node of the fourth switch and the fifth switch;
the first common node of the second group of switches is a common node of the sixth switch and the seventh switch;
the second common node of the second group of switches is a common node of the seventh switch and the eighth switch;
the third common node of the second group of switches is a common node of the eighth switch and the ninth switch; and
the last common node of the second group of switches is a common node of the ninth switch and the tenth switch.

8. The apparatus of claim 7, further comprising:
a load switch connected between a load and at least one of the first port, the second port and the third port.

9. The apparatus of claim 7, wherein:
in the hybrid operating mode, the fourth switch and the ninth switch are configured as always-on switches;
the first switch and the third switch is controlled by a first gate drive signal having a duty cycle D;
the sixth switch and the eighth switch to be controlled by a second gate drive signal having the duty cycle D, and wherein the first gate drive signal and the second gate drive signal are 180 degrees out of phase from each other;
the second switch and the fifth switch to be controlled by a third gate drive signal, and wherein the first gate drive signal and the third gate drive signal are two complementary signals; and
the seventh switch and the tenth switch to be controlled by a fourth gate drive signal, and wherein the second gate drive signal and the fourth gate drive signal are two complementary signals, and wherein in the hybrid operating mode, a ratio of a voltage on the first port to a voltage on the second port is 2:1, and a ratio of the voltage on the second port to a voltage on the third port is 1:D.

10. The apparatus of claim 7, wherein:
in the boost/buck operating mode, the third switch and the eighth switch are configured as always-on switches;
the fourth switch is controlled by a fifth gate drive signal having a duty cycle D;
the fifth switch is controlled by a sixth gate drive signal, and wherein the fifth gate drive signal and the sixth gate drive signal are two complementary signals;
the ninth switch is controlled by a seventh gate drive signal having a duty cycle D;
the tenth switch is controlled by an eighth gate drive signal, and wherein the seventh gate drive signal and the eighth gate drive signal are two complementary signals, and the fifth gate drive signal and the seventh gate drive signal are 180 degrees out of phase from each other, and wherein:
a ratio of a voltage on the first port to a voltage on the second port is 1:1; and
a ratio of the voltage on the second port to a voltage on the third port is 1:D.

11. The apparatus of claim 1, wherein:
the first group of switches comprise an eleventh switch, a twelfth switch, a thirteenth switch and a fourteenth switch connected in series between the first voltage bus and the second voltage bus; and
the second group of switches comprise a fifteenth switch, a sixteenth switch, a seventeenth switch and an eighteenth switch connected in series between the first voltage bus and the second voltage bus.

12. The apparatus of claim 11, wherein:
the first common node of the first group of switches is a common node of the eleventh switch and the twelfth switch;
the second common node of the first group of switches is a common node of the twelfth switch and the thirteenth switch;
the third common node of the first group of switches is the last common node of the first group of switches, and wherein the third common node of the first group of switches is a common node of the thirteenth switch and the fourteenth switch;
the first common node of the second group of switches is a common node of the fifteenth switch and the sixteenth switch;
the second common node of the second group of switches is a common node of the sixteenth switch and the seventeenth switch; and
the third common node of the second group of switches is the last common node of the second group of switches, and wherein the third common node of the second group of switches is a common node of the seventeenth switch and the eighteenth switch.

13. The apparatus of claim 11, further comprising:
an input source selecting module coupled to the first port, wherein:
  the first port is configured to be connected to a first input power source;
  the second port is configured to be connected to a first load;
  the third port is configured to be connected to a second load;
  the input source selecting module comprises two back-to-back connected transistors; and
  the input source selecting module is configured to be coupled between the first input power source and a second input power source.

14. The apparatus of claim 11, further comprising:
a nineteenth switch connected in series with the first flying capacitor;
a first inductor connected in series with the first flying capacitor;
a second inductor connected in series with the second flying capacitor;
a first output inductor connected between the last common node of the first group of switches and the third port; and
a second output inductor connected between the last common node of the second group of switches and the third port, wherein:
  the first flying capacitor, the first inductor and the nineteenth switch are connected in series between a common node of the eleventh switch and the twelfth switch, and a common node of the thirteenth switch and the fourteenth switch; and
  the second flying capacitor and the second inductor are connected in series between a common node of the fifteenth switch and the sixteenth switch, and a common node of the seventeenth switch and the eighteenth switch.

15. The apparatus of claim 14, wherein:
in the boost/buck operating mode, the nineteenth switch is configured as an always-off switch.

16. A method comprising:
providing a power conversion device having a first leg comprising a first switch, a second switch, a third switch, a fourth switch and a fifth switch connected in series between a first port and ground, a second leg comprising a sixth switch, a seventh switch, an eighth switch, a ninth switch and a tenth switch connected in series between the first port and ground, a first flying capacitor coupled to the first leg, a second flying capacitor coupled to the second leg, a second port connected to a common node of the second switch and the third switch, and a common node of the seventh switch and the eighth switch, and a third port connected to a common node of the fourth switch and the fifth switch through a first inductor, and a common node of the ninth switch and the tenth switch through a second inductor; and
configuring switches of the first leg and the second leg such that the power conversion device operates in one of three operating modes including a bypass operating mode, a hybrid operating mode and a boost/buck operating mode.

17. The method of claim 16, further comprising:
in the bypass operating mode, configuring the first switch, the second switch, the third switch, the fourth switch, the sixth switch, the seventh switch, the eighth switch and the ninth switch as always-on switches; and
configuring the fifth switch and the tenth switch as always-off switches, in the bypass operating mode, a voltage on the first port is equal to a voltage on the second port, and a voltage on the third port is equal to the voltage on the second port.

18. The method of claim 16, further comprising:
in the hybrid operating mode, allowing the first switch and the third switch to be controlled by a first gate drive signal having a duty cycle D;
allowing the sixth switch and the eighth switch to be controlled by a second gate drive signal having the duty cycle D, and wherein the first gate drive signal and the second gate drive signal are 180 degrees out of phase from each other;
allowing the second switch and the fifth switch to be controlled by a third gate drive signal, and wherein the first gate drive signal and the third gate drive signal are two complementary signals;
allowing the seventh switch and the tenth switch to be controlled by a fourth gate drive signal, and wherein the second gate drive signal and the fourth gate drive signal are two complementary signals; and
configuring the fourth switch and the ninth switch as always-on switches, and wherein in the hybrid operating mode, a ratio of a voltage on the first port to a voltage on the second port is 2:1, and a ratio of the voltage on the second port to a voltage on the third port is 1:D.

19. The method of claim 16, further comprising:
in the boost/buck operating mode, allowing the fourth switch to be controlled by a fifth gate drive signal having a duty cycle D;
allowing the ninth switch to be controlled by a seventh gate drive signal having the duty cycle D, and wherein the fifth gate drive signal and the seventh gate drive signal are 180 degrees out of phase from each other;
allowing the fifth switch to be controlled by a sixth gate drive signal, and wherein the fifth gate drive signal and the sixth gate drive signal are two complementary signals;
allowing the tenth switch to be controlled by an eighth gate drive signal, and wherein the seventh gate drive signal and the eighth gate drive signal are two complementary signals; and configuring the first switch, the second switch, the third switch, the sixth switch, the seventh switch and the eighth switch as always-on switches, and wherein in the boost/buck operating mode, a ratio of a voltage on the first port to a voltage on the second port is 1:1, and a ratio of the voltage on the second port to a voltage on the third port is 1:D.

20. A converter comprising:
   a first switch, a second switch, a third switch, a fourth switch and a fifth switch connected in series between a first port of the converter and ground;
   a sixth switch, a seventh switch, an eighth switch, a ninth switch and a tenth switch connected in series between the first port of the converter and ground;
   a first flying capacitor connected between a common node of the first switch and the second switch, and a common node of the third switch and the fourth switch;
   a second flying capacitor connected between a common node of the sixth switch and the seventh switch, and a common node of the eighth switch and the ninth switch;
   a first inductor connected between a common node of the fourth switch and the fifth switch, and a third port; and
   a second inductor connected between a common node of the ninth switch and the tenth switch, and the third port.

21. The converter of claim 20, wherein:
   a second port of the converter is connected to a common node of the second switch and the third switch, and a common node of the seventh switch and the eighth switch; and
   the converter is configured to operate in a hybrid operating mode, and wherein in the hybrid operating mode, a ratio of a voltage on the first port to a voltage on the second port is 2:1, and a ratio of the voltage on the second port to a voltage on the third port is 1:D.

* * * * *